US012809778B2

(12) United States Patent
Qiu et al.

(10) Patent No.: US 12,809,778 B2
(45) Date of Patent: Nov. 24, 2026

(54) STORAGE METHOD AND APPARATUS, AND ELECTRONIC DEVICE

(71) Applicant: HUAWEI TECHNOLOGIES CO., LTD., Shenzhen (CN)

(72) Inventors: Jie Qiu, Hangzhou (CN); Wei Fang, Hangzhou (CN); Hongjiang Zhao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/065,760

(22) Filed: Feb. 27, 2025

(65) Prior Publication Data

US 2025/0199958 A1 Jun. 19, 2025

Related U.S. Application Data

(63) Continuation of application No. PCT/CN2023/103559, filed on Jun. 29, 2023.

(30) Foreign Application Priority Data

Aug. 31, 2022 (CN) ........................ 202211066503.X

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC ............. G06F 12/0802; G06F 2212/60; G06F 12/126; G06F 2212/222; G06F 2212/282; G06F 2212/283; G06F 2212/502; G06F 2212/7203; G06F 2212/7204; G06F 2212/7206; G06F 3/0604; G06F 3/0679; G06F 12/0246; G06F 12/0871;
(Continued)

(56) References Cited

U.S. PATENT DOCUMENTS

| | | | | |
|---|---|---|---|---|
| 9,852,149 | B1 | 12/2017 | Taylor et al. | |
| 11,256,620 | B1 * | 2/2022 | Brandt | G06F 12/0802 |

(Continued)

FOREIGN PATENT DOCUMENTS

| | | | |
|---|---|---|---|
| CN | 111104066 | A | 5/2020 |

*Primary Examiner* — Jared I Rutz
*Assistant Examiner* — Wei Ma
(74) *Attorney, Agent, or Firm* — Leydig, Voit & Mayer, Ltd.

(57) ABSTRACT

A storage apparatus includes an over-provisioning (OP) reporting module and a cache management module. A storage method includes: The OP reporting module reports information about first OP to the cache management module, where the first OP is unoccupied OP obtained from OP of a flash storage device, and the OP reporting module and the cache management module are located respectively at a device layer and a kernel layer of the storage apparatus; and the cache management module configures a cache area based on the information about the first OP, where the cache area includes the first OP. According to the method, the management module at the kernel layer can configure redundant over-provisioning at the device layer, and the redundant over-provisioning can be used for caching user data.

20 Claims, 9 Drawing Sheets

(58) Field of Classification Search
CPC ...... G06F 12/0888; G06F 12/127; G06F 3/06; G06F 12/0897
USPC .......................................................... 711/118
See application file for complete search history.

(56) References Cited

U.S. PATENT DOCUMENTS

| | | | | |
|---|---|---|---|---|
| 2005/0172082 | A1* | 8/2005 | Liu | G06F 12/0866<br>711/3 |
| 2012/0297140 | A1* | 11/2012 | Wu | G06F 12/0897<br>711/E12.07 |
| 2015/0113223 | A1* | 4/2015 | Brown | G06F 12/0893<br>711/133 |
| 2016/0335191 | A1* | 11/2016 | Dong | G06F 12/0891 |
| 2020/0073823 | A1* | 3/2020 | Kourtis | G06F 12/0253 |
| 2021/0224198 | A1* | 7/2021 | Gahlot | G06F 12/1483 |

* cited by examiner

STORAGE METHOD AND APPARATUS, AND ELECTRONIC DEVICE

CROSS-REFERENCE TO RELATED APPLICATIONS

This application is a continuation of International Application No. PCT/CN2023/103559, filed on Jun. 29, 2023, which claims priority to Chinese Patent Application No. 202211066503.X, filed on Aug. 31, 2022. The disclosures of the aforementioned applications are hereby incorporated by reference in their entireties.

TECHNICAL FIELD

Embodiments of this application relate to the storage field, and in particular, to a storage method and apparatus, and an electronic device.

BACKGROUND

With development of storage technologies, products related to flash storage gradually develop towards a direction of high storage density. However, as the storage density increases, some negative effects caused by density increase also begin to emerge. For example, access performance of the flash storage deteriorates, and an access performance decrease ratio even exceeds a density increase ratio. In addition, storage reliability decreases to some extent.

Therefore, a storage method urgently needs to be provided, so that negative effect caused by density increase can be reduced while storage density is increased.

SUMMARY

This application provides a storage method and apparatus, and an electronic device. The method is applied to a storage apparatus. The storage apparatus includes an over-provisioning (OP) reporting module and a cache management module. The method includes: The OP reporting module reports information about first OP to the cache management module, where the first OP is unoccupied OP obtained from OP of a flash storage device, the OP reporting module is located at a device layer of the storage apparatus, and the cache management module is located at a kernel layer of the storage apparatus; and the cache management module configures a cache area based on the information about the first OP, where the cache area includes the first OP. Optionally, the flash storage device may be a UFS device.

It should be understood that the over-provisioning OP of the flash storage device includes the first OP.

Optionally, the cache area is used for caching data. User data refers to data delivered by an application APP, for example, user data.

The information about the first OP includes space storage information of the first OP, for example, a performance parameter like a size of available storage space.

Optionally, the cache area may be any one of a single-level cell SLC cache area, a multi-level cell MLC cache area, a triple-level cell TLC cache area, and a quad-level cell QLC cache area.

Specifically, when a storage medium configured at the device layer is a QLC, the cache area may be any one of the TLC cache area, the MLC cache area, and the SLC cache area, where the SLC cache area refers to a cache area configured with an SLC write manner, the MLC cache area refers to a cache area configured with an MLC write manner, and the TLC cache area refers to a cache area configured with a TLC write manner;

when the storage medium configured at the device layer is a TLC, the cache area may be either the MLC cache area or the SLC cache area; or when the storage medium configured at the device layer is an MLC, the cache area may be the SLC cache area.

It should be understood that when a storage medium configured at the device layer in the future is a flash medium with higher density, the cache area may be configured as a cache area with any flash medium write manner with lower density than that of the flash medium with higher density.

In this embodiment of this application, a static cache area on the flash storage device side is canceled. Redundant over-provisioning of the flash storage device is reported to a file system (including the cache management module) at the kernel layer of the storage apparatus, to act as storage space (cache area) invisible to a user, so that the file system performs unified configuration, and the redundant over-provisioning can be used for caching user data. This can improve storage space utilization and storage efficiency.

With reference to the first aspect, in a possible implementation, the cache area further includes OP of the file system, and the file system is located at the kernel layer of the storage apparatus.

In this embodiment of this application, the static cache area on the flash storage device side is canceled. The redundant over-provisioning of the flash storage device is reported to the file system, and the redundant over-provisioning of the flash storage device and idle reserved storage space of the file system are integrated into storage space (cache area) invisible to the user, so that the file system performs unified configuration, and the redundant over-provisioning can be used for caching user data. This can improve storage space utilization and storage efficiency.

With reference to the first aspect, in a possible implementation, that the cache management module configures a cache area includes: When available space of the cache area is greater than or equal to a first threshold, the cache management module writes the user data delivered by the application APP into the cache area.

In this embodiment of this application, when current available space of the cache area is sufficient, a cache policy is not determined based on second information (a category of a request message carrying the user data) corresponding to a request message delivered by the APP, but all user data delivered by the APP is written into the cache area. This can further improve cache space utilization and cache efficiency, and improve use experience of the user.

With reference to the first aspect, in a possible implementation, that the cache management module configures a cache area further includes: The cache management module determines a category corresponding to a request message delivered by the application APP, where the request message carries the user data delivered by the APP; and the cache management module determines, based on the category corresponding to the request message, a cache policy for the user data delivered by the APP, and caches, according to the cache policy, the user data delivered by the APP.

The storage apparatus may further include an APP grouping module. That the cache management module determines a category corresponding to a request message delivered by the APP may include: The APP grouping module groups the APP based on first information corresponding to the APP, where the first information includes one or more of priority information of the APP, behavior information of the APP, and attribute information of the APP; the APP grouping module determines, based on a grouping status of the APP, second information corresponding to the request message delivered by the APP, where the second information includes one or more of priority information of the request message, behavior information of the request message, foreground or background information of the request message, and cold or hot attribute information of the request message; and the cache management module determines, based on the second information corresponding to the request message, the category corresponding to the request message.

Further, that the cache management module determines, based on the second information corresponding to the request message, the category corresponding to the request message includes: When the behavior information of the request message is a specific behavior, the cache management module determines that the category corresponding to the request message is a first category; when the behavior information of the request message is a non-specific behavior, and one or more of the following is satisfied: The priority information is a high priority, the cold or hot attribute information is hot, and the foreground or background information is a foreground APP, the cache management module determines that the category corresponding to the request message is a second category; or when the behavior information of the request message is a non-specific behavior, and one or more of the following is satisfied: The priority information is a low priority, the cold or hot attribute information is cold, and the foreground or background information is a background APP, the cache management module determines that the category corresponding to the request message is a third category.

In this embodiment of this application, a user scenario (the category of the request message) can be perceived based on grouping information of the application, to provide a more proper SLC cache policy for the user data, thereby ensuring full-time high-speed write of a key application and high-speed read of a key scenario (for example, the application is switched from a background to a foreground).

With reference to the first aspect, in a possible implementation, that the cache management module determines, based on the category corresponding to the request message, a cache policy for the user data delivered by the APP, and caches, according to the cache policy, the user data delivered by the APP includes: When the category corresponding to the request message is the first category, the cache management module writes the user data carried in the request message into the cache area, and locks the user data carried in the request message in the cache area; when the category corresponding to the request message is the second category, the cache management module writes the user data carried in the request message into the cache area; or when the category corresponding to the request message is the third category, the cache management module directly writes the user data carried in the request message into a triple-level cell TLC storage area.

In this embodiment of this application, a proper cache policy is determined based on the category of the request message delivered by the APP, so that some user data of low importance (a cache does not need to be used) is directly written into the TLC storage area, thereby avoiding two times of storage of the user data in a short time, and further avoiding extra flow overheads. In addition, user data delivered by a key APP can be locked in the cache area, so that full-time high-speed write of the key application and high-speed read of a key scenario (for example, the application is switched from the background to the foreground) can be ensured, thereby improving user experience.

With reference to the first aspect, in a possible implementation, that the cache management module caches, according to the cache policy, the user data delivered by the APP includes: When available space of the cache area is less than a first threshold, the cache management module caches, according to the cache policy, the user data delivered by the APP.

Optionally, the first threshold is one fourth of the cache area, or may be one third of the cache area, or may be another threshold. This is not limited in this application.

In this embodiment of this application, if the available space of the cache area is greater than the first threshold, it indicates that the available space of the cache area is sufficient, and all user data delivered by the APP may be stored in the cache area. Only when the available space of the cache area is less than the first threshold, the user data delivered by the APP is cached according to the cache policy. In this way, the available space can be fully utilized when the available space is sufficient, and space utilization can be improved.

With reference to the first aspect, in a possible implementation, the storage apparatus further includes a garbage collection management module, and the method further includes: When the available space of the cache area is less than a second threshold, the garbage collection management module migrates the user data in the cache area to the triple-level cell TLC storage area.

Optionally, the second threshold is one seventh of the cache area, or may be one eighth of the cache area, or may be another threshold. This is not limited in this application.

In this embodiment of this application, when it is identified that the available space of the cache area is insufficient, some unnecessary user data is migrated to the TLC storage area in time. In this way, a cache error caused because space of the cache area is occupied by unnecessary user data for a long time can be avoided.

With reference to the first aspect, in a possible implementation, the information about the first OP may further include bad block information of the first OP. The bad block information of the first OP is used to perform bad block synchronization on the cache area.

In this embodiment of this application, the bad block information of the first OP is synchronized in time, and SLC cache space is synchronously reduced, so that a storage error caused by use of a bad block can be avoided.

According to a second aspect, a storage apparatus is provided. The apparatus includes an over-provisioning OP reporting module and a cache management module. The over-provisioning reporting module is configured to report information about first OP to the cache management module, and the first OP is unoccupied OP obtained from OP of a flash storage device. The OP reporting module is located at a device layer of the storage apparatus, and the cache management module is located at a kernel layer of the storage apparatus. The cache management module is configured to configure a cache area based on the information about the first OP, and the cache area includes the first OP.

Optionally, the flash storage device may be a UFS device.

Optionally, the cache area is used for caching data. User data refers to data delivered by an application APP, for example, user data.

The information about the first OP includes space storage information of the first OP, for example, a performance parameter like a size of available storage space.

Optionally, the cache area may be any one of a single-level cell SLC cache area, a multi-level cell MLC cache area, a triple-level cell TLC cache area, and a quad-level cell QLC cache area.

Specifically, when a storage medium configured at the device layer is a QLC, the cache area may be any one of the TLC cache area, the MLC cache area, and the SLC cache area, where the SLC cache area refers to a cache area configured with an SLC write manner, the MLC cache area refers to a cache area configured with an MLC write manner, and the TLC cache area refers to a cache area configured with a TLC write manner;

when the storage medium configured at the device layer is a TLC, the cache area may be either the MLC cache area or the SLC cache area; or when the storage medium configured at the device layer is an MLC, the cache area may be the SLC cache area.

It should be understood that when a storage medium configured at the device layer in the future is a flash medium with higher density, the cache area may be configured as a cache area with any flash medium write manner with lower density than that of the flash medium with higher density.

In this embodiment of this application, a static cache area on the flash storage device side is canceled. Idle storage redundant over-provisioning of the flash storage device is reported to a file system (including the cache management module) at the kernel layer of the storage apparatus as storage space (cache area) invisible to a user, so that the file system performs unified configuration, and the redundant over-provisioning can be used for caching user data. This can improve storage space utilization and storage efficiency.

With reference to the second aspect, in a possible implementation, the cache area further includes OP of the file system, and the file system is located at the kernel layer of the storage apparatus.

In this embodiment of this application, the static cache area on the flash storage device side is canceled. The redundant over-provisioning of the flash storage device is reported to the file system, and the redundant over-provisioning of the flash storage device and idle reserved storage space of the file system are integrated into storage space (cache area) invisible to the user, so that the file system performs unified configuration, and the redundant over-provisioning can be used for caching user data. This can improve storage space utilization and storage efficiency.

With reference to the second aspect, in a possible implementation, the cache management module is further configured to: when available space of the cache area is greater than or equal to a first threshold, write the user data delivered by the application APP into the cache area.

In this embodiment of this application, when current available space of the cache area is sufficient, a cache policy is not determined based on second information (a category of a request message carrying the user data) corresponding to a request message delivered by the APP, but all user data delivered by the APP is written into the cache area. This can further improve cache space utilization and cache efficiency, and improve use experience of the user.

With reference to the second aspect, in a possible implementation, the cache management module is further configured to: determine a category corresponding to the request message delivered by the APP, where the request message carries the user data delivered by the APP; and determine, based on the category corresponding to the request message, a cache policy for the user data delivered by the APP, and cache, according to the cache policy, the user data delivered by the APP.

With reference to the second aspect, in a possible implementation, the apparatus further includes an APP grouping module. The APP grouping module is configured to group the APP based on first information corresponding to the APP. The first information includes one or more of priority information of the APP, behavior information of the APP, and attribute information of the APP. The APP grouping module is further configured to determine, based on a grouping status of the APP, the second information corresponding to the request message delivered by the APP. The second information includes one or more of priority information of the request message, behavior information of the request message, foreground or background information of the request message, and cold or hot attribute information of the request message. The cache management module is specifically configured to determine, based on the second information corresponding to the request message, the category corresponding to the request message.

The cache management module is specifically configured to: when the behavior information of the request message is a specific behavior, determine that the category corresponding to the request message is a first category; when the behavior information of the request message is a non-specific behavior, and one or more of the following is satisfied: The priority information is a high priority, the cold or hot attribute information is hot, and the foreground or background information is a foreground APP, determine that the category corresponding to the request message is a second category; or when the behavior information of the request message is a non-specific behavior, and one or more of the following is satisfied: The priority information is a low priority, the cold or hot attribute information is cold, and the foreground or background information is a background APP, determine that the category corresponding to the request message is a third category.

In this embodiment of this application, a user scenario (the category of the request message) can be perceived based on grouping information of the application, to provide a more proper SLC cache policy for the user data, thereby ensuring full-time high-speed write of a key application and high-speed read of a key scenario (for example, the application is switched from a background to a foreground).

With reference to the second aspect, in a possible implementation, the cache management module is specifically configured to: when the category corresponding to the request message is the first category, write the user data carried in the request message into the cache area, and lock the user data carried in the request message in the cache area; when the category corresponding to the request message is the second category, write the user data carried in the request message into the cache area; or when the category corresponding to the request message is the third category, directly write the user data carried in the request message into a triple-level cell TLC storage area.

In this embodiment of this application, a proper cache policy is determined based on the category of the request message delivered by the APP, so that some user data of low importance (a cache does not need to be used) is directly written into the TLC storage area, thereby avoiding two times of storage of the user data in a short time, and further avoiding extra flow overheads. In addition, user data delivered by a key APP can be locked in the cache area, so that full-time high-speed write of the key application and high-speed read of a key scenario (for example, the application is switched from the background to the foreground) can be ensured, thereby improving user experience.

With reference to the second aspect, in a possible implementation, the cache management module is further specifically configured to: when the available space of the cache area is less than the first threshold, cache, according to the cache policy, the user data delivered by the APP.

Optionally, the first threshold is one fourth of the cache area, or may be one third of the cache area, or may be another threshold. This is not limited in this application.

In this embodiment of this application, if the available space of the cache area is greater than the first threshold, it indicates that the available space of the cache area is sufficient, and all user data delivered by the APP may be stored in the cache area. Only when the available space of the cache area is less than the first threshold, the user data delivered by the APP is cached according to the cache policy. In this way, the available space can be fully utilized when the available space is sufficient, and space utilization can be improved.

With reference to the second aspect, in a possible implementation, the apparatus further includes a garbage collection management module. The garbage collection management module is configured to migrate the user data in the cache area to the triple-level cell TLC storage area when the available space of the cache area is less than a second threshold.

Optionally, the second threshold is one seventh of the cache area, or may be one eighth of the cache area, or may be another threshold. This is not limited in this application.

In this embodiment of this application, when it is identified that the available space of the cache area is insufficient, some unnecessary user data is migrated to the TLC storage area in time. In this way, a cache error caused because space of the cache area is occupied by unnecessary user data for a long time can be avoided.

With reference to the second aspect, in a possible implementation, the information about the first OP further includes bad block information of the first OP. The apparatus further includes: a bad block synchronization module, configured to perform bad block synchronization on the cache area based on the bad block information of the first OP.

In this embodiment of this application, the bad block synchronization module synchronizes the bad block information of the first OP in time, and synchronously reduces SLC cache space, so that a storage error caused by use of a bad block can be avoided.

According to a third aspect, an electronic device is provided. The electronic device includes a memory and a processor. The memory is configured to store computer program code, and the processor is configured to execute the computer program code stored in the memory, to implement the method in the first aspect or any possible implementation of the first aspect.

According to a fourth aspect, a chip is provided. The chip stores instructions. When the instructions are run on a device, the chip is enabled to perform the method in the first aspect or any possible implementation of the first aspect.

According to a fifth aspect, a computer-readable storage medium is provided. The computer-readable storage medium stores a computer program or instructions. When the computer program or the instructions are executed, the method in the first aspect or any possible implementation of the first aspect is implemented.

DESCRIPTION OF EMBODIMENTS

Figure 1:
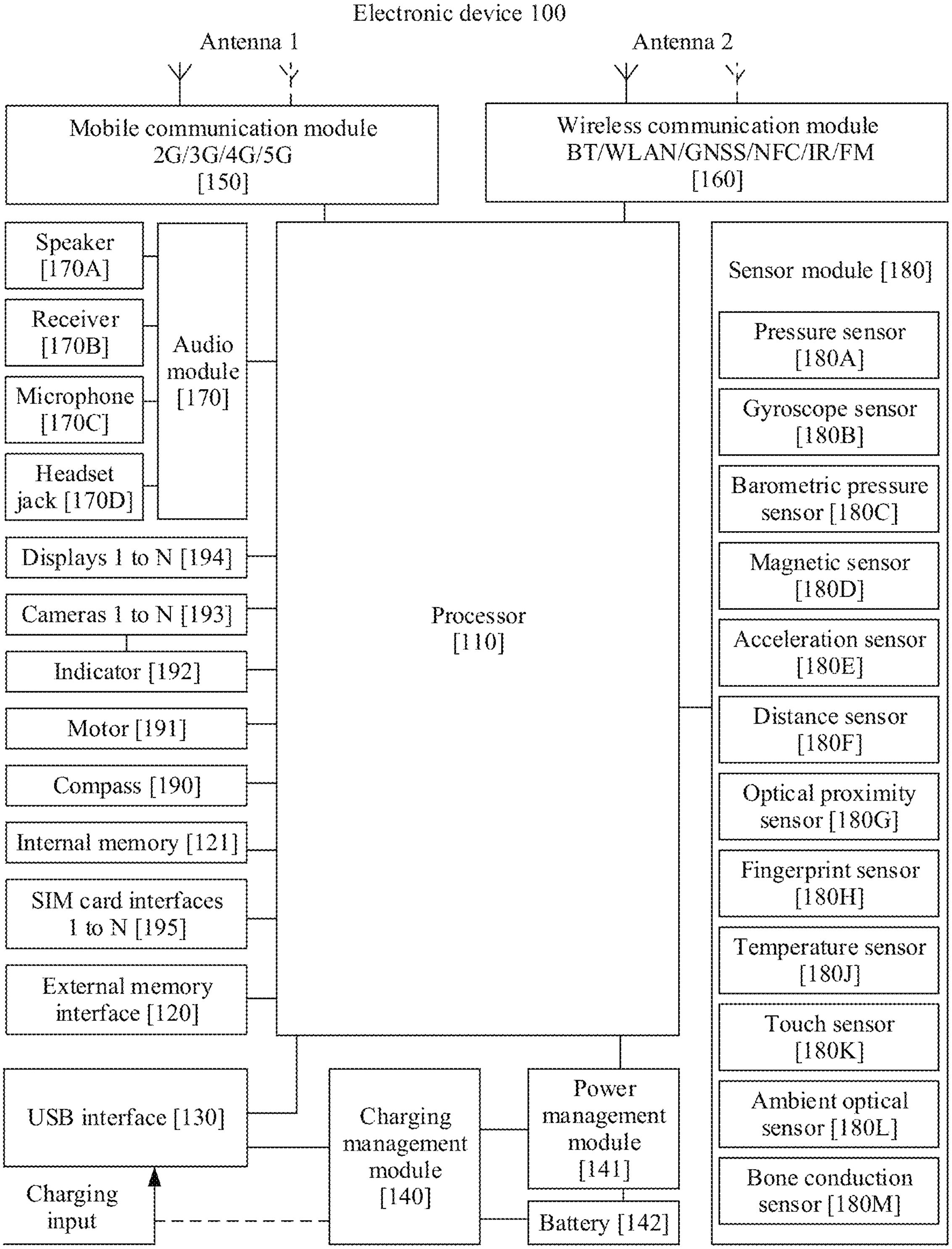
FIG. 1 is a diagram of a structure of an electronic device according to an embodiment of this application.

The following describes technical solutions of this application with reference to accompanying drawings. It is clear that the described embodiments are merely some but not all embodiments of this application.

The following describes technical solutions in embodiments of this application with reference to the accompanying drawings in embodiments of this application. In descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of embodiments of this application, "multiple" or "a plurality of" means two or more than two.

Terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In descriptions of embodiments, unless otherwise specified, "a plurality of" means two or more.

Terms used in the following embodiments are merely intended to describe specific embodiments, but are not intended to limit this application. As used in the specification and the appended claims of this application, singular expressions "a/an", "one", "said", "the above", "the" and "this" are intended to also include such expressions as "one or more", unless otherwise clearly indicated in the context. It should be further understood that in the following embodiments of this application, "at least one" and "one or more" refer to one, two, or more. The term "and/or" is used to describe an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to embodiments. Therefore, statements such as "one embodiment", "some embodiments", "other embodiments", and "some other embodiments" appearing in different parts of this specification do not necessarily refer to a same embodiment, but mean "one or more but not all embodiments", unless otherwise emphasized. Terms "include", "comprise", "have", and their variants all mean "include but are not limited to", unless otherwise specifically emphasized in another manner.

A method provided in embodiments of this application may be applied to an electronic device like a mobile phone, a tablet computer, a wearable device, an in-vehicle device, an augmented reality (AR) device/a virtual reality (VR) device, a notebook computer, an ultra-mobile personal computer (UMPC), a netbook, or a personal digital assistant (PDA). A specific type of the electronic device is not limited in embodiments of this application.

The following first describes in detail some terms in embodiments of this application.

1. Flash Storage

A flash storage is a non-volatile memory that can be written and erased for a plurality of times and can maintain data for a long time without a current or voltage supply. The flash storage has the following four manners:

(1) A single-level cell (SLC) is a manner of organizing information stored in the flash storage. Each cell (cell) can store only 1 bit of information. Storage density is low, but an access (flash storage operations such as read, write, and erase) speed is high.

(2) A multi-level cell (MLC) is a manner of organizing information stored in the flash storage. Each unit can store 2-bit data. Compared with the single-level cell (SLC) flash storage, the multi-level cell flash storage is cost-effective, making it a desirable choice for consumer-level solid-state storage. A disadvantage of the MLC is that the MLC has a higher bit error rate than the SLC because the MLC has a higher probability of misreading a unit state.

(3) A triple-level cell (TLC) is a manner of organizing information stored in the flash storage. Each cell can store only 3-bit information. Storage density is high, but an access (flash storage operations such as read, write, and erase) speed is slow.

The MLC and the TLC can be dynamically set during running based on block (a flash storage includes a plurality of blocks) granularity.

(4) A quad-level cell (QLC) is a manner of organizing information stored in the flash storage. Each unit of the QLC can store 4-bit data. In comparison with the TLC, storage density of the QLC is increased by 33%. The QLC not only can withstand 1000 programming or erase cycles (equivalent to or even better than the TLC), but also has increased capacity and lower costs.

2. Bad Block

A bad block indicates that some flash storage areas in a NAND flash storage cannot be erased or written. Such a unit area is called a bad block. Read and write operations in the NAND flash storage are performed by page, an erase operation is performed by block, and the erase operation need to be performed before the write operation. Therefore, a minimum operable unit is a block. If any uncorrectable bit error occurs in a block, the block is considered as a bad block.

For example, FIG. 1 is a diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash storage, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component like the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device like an AR device.

It may be understood that an interface connection relationship between modules illustrated in this embodiment of this application is merely an illustrative description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, to supply power to the processor 110, the internal memory 121, an external memory, the display 194, the camera 193, the wireless communication module 160, and the like. The power management module 141 may be further configured to monitor a parameter such as a battery capacity, a battery cycle count, or a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 170A, the receiver 170B, and the like), and displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division synchronous code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device

100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an App required by at least one function (for example, a sound playing function or an image playing function), and the like. The data storage area may store data (for example, audio data or an address book) and the like created when the electronic device 100 is used. In addition, the internal memory 121 may include a high-speed random access memory, and may further include a non-volatile memory, for example, at least one magnetic disk storage device, a flash storage device, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (OMTP) standard interface, or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a Messages application icon, an instruction for viewing the Messages is performed. When a touch operation whose touch operation intensity is greater than or equal to the first pressure threshold is performed on the Messages application icon, an instruction for creating a new message is performed.

The gyroscope sensor 180B may be configured to determine a moving posture of the electronic device 100. In some embodiments, an angular velocity of the electronic device 100 around three axes (that is, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude through barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations of the electronic device 100 in various directions (usually on three axes). When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light emitting diode may be an infrared light emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photo taking and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an embedded-SIM (eSIM) card, namely, an embedded-SIM card. The eSIM card may be embedded into the electronic device 100, and cannot be separated from the electronic device 100.

It should be understood that a calling card in embodiments of this application includes but is not limited to a SIM card, an eSIM card, a universal subscriber identity module (USIM), a universal integrated circuit card (UICC), and the like.

A software system of the electronic device 100 may use a layered architecture, an event-driven architecture, a microkernel architecture, a micro service architecture, or a cloud architecture. In this embodiment of this application, an Android system with a layered architecture is used as an example to describe a software structure of the electronic device 100.

Figure 2:
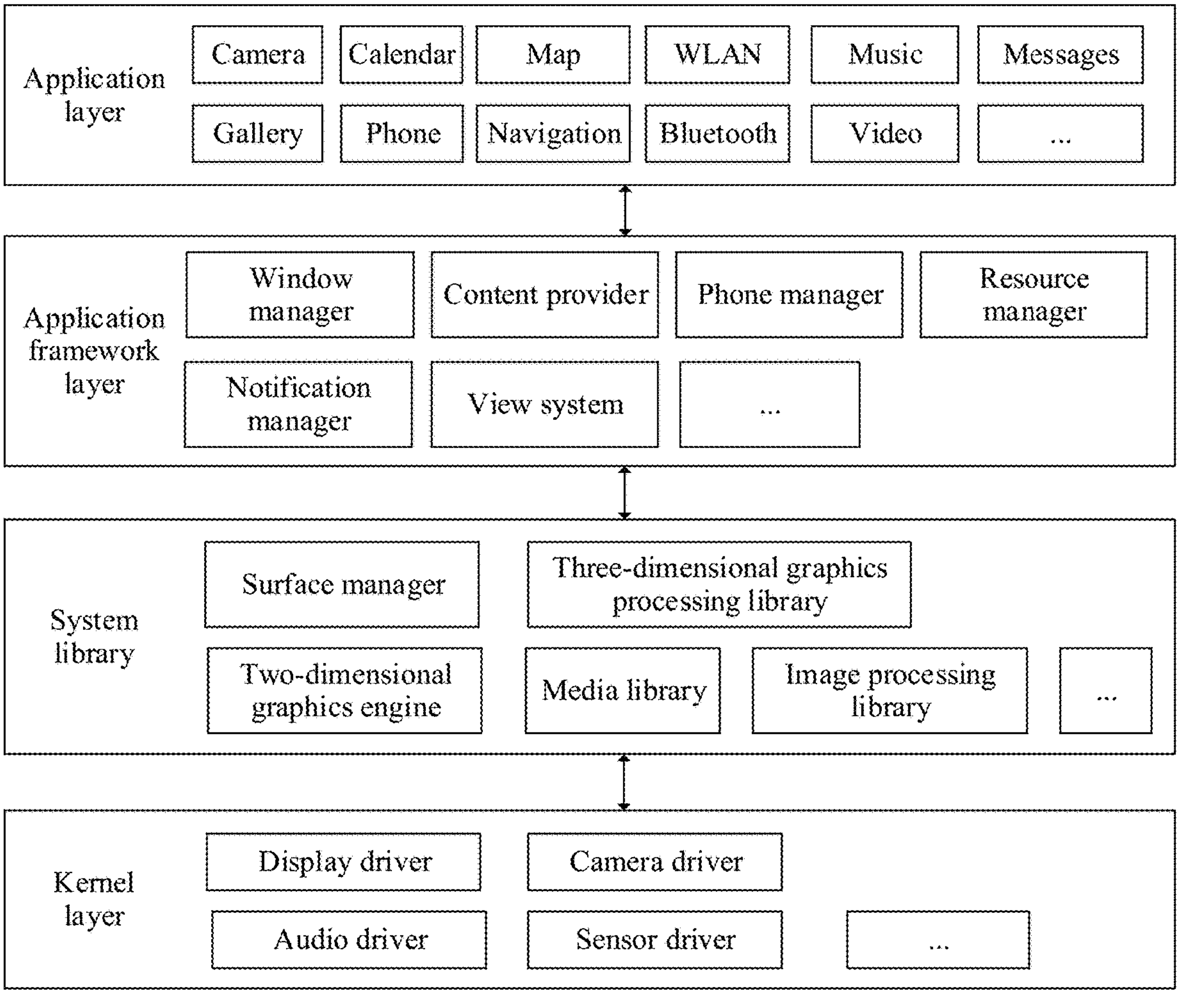
FIG. 2 is a block diagram of a software structure of an electronic device according to an embodiment of this application.

FIG. 2 is a block diagram of the software structure of the electronic device 100 in this embodiment of this application. In a layered architecture, software is divided into several layers, and each layer has a clear role and task. The layers communicate with each other through a software interface. In some embodiments, the Android system is divided into four layers: an application layer, an application framework layer, an Android runtime and a system library, and a kernel layer. The application layer may include a series of application packages.

As shown in FIG. 2, the application packages may include applications such as Camera, Gallery, Calendar, Phone, Map, Navigation, WLAN, Bluetooth, Music, Video, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, audio, dialed and answered calls, a browsing history, a bookmark, an address book, and the like.

The view system includes visual controls such as a control for displaying text and a control for displaying an image. The view system may be configured to construct an application. A display interface may include one or more views. For example, the display interface including a Messages notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be understood that the technical solutions in embodiments of this application may be applied to systems such as Android, IOS, and HarmonyOS.

The technical solutions in embodiments of this application may be applied to a memory management scenario of a device like an electronic device or a server.

The electronic device in embodiments of this application may be a television set, a desktop computer, or a notebook computer, or may be a portable electronic device like a mobile phone, a tablet computer, a camera, a video camera, or a video recorder, or may be another electronic device having a storage function, an electronic device in a 5G network, an electronic device in a future evolved public land mobile communication network (PLMN), or the like. This is not limited in this application.

Figure 3:
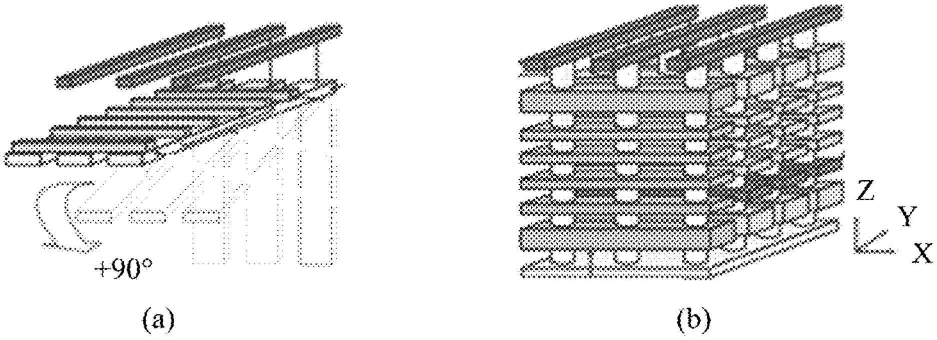
FIG. 3 is a diagram of a structure of a 2D flash medium and a structure of a 3D-TLC particle.

Currently, a mainstream flash medium in the industry uses a 3D triple-level cell (TLC) particle. FIG. 3 shows a diagram of a structure of a 2D flash medium (as shown in (a) in FIG. 3) and a structure of a 3D-TLC particle (as shown in (b) in FIG. 3). It can be learned from FIG. 3 that, in comparison with the 2D flash medium, storage density of the 3D flash medium is significantly improved.

The 3D-TLC particle is used as the flash medium, so that storage density of the flash storage is increased. However, as the storage density of the flash storage increases, some negative effects of density increase also begin to emerge. For example, memory access performance deteriorates, and a decrease ratio even exceeds a density increase ratio. In addition, storage reliability decreases to some extent.

Figure 4:
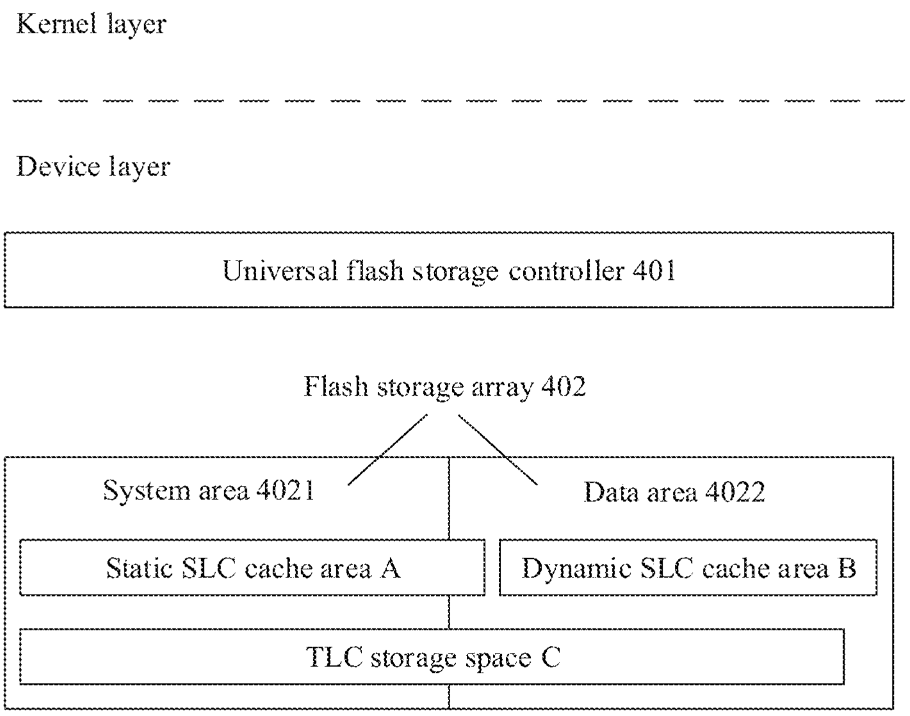
FIG. 4 is a diagram of a flash storage apparatus.

For this problem, FIG. 4 is a diagram of a flash storage apparatus. The apparatus uses a dynamically configurable medium mode. As shown in FIG. 4, a device layer of the apparatus includes a universal flash storage (UFS) controller 401 and a flash storage array 402. The flash storage array 402 may also be described as flash storage space.

Specifically, under an instruction of a system file (host) located at a kernel layer, the UFS controller 401 divides the flash storage array 402 into a system area 4021 and a data area 4022. The system area 4021 is used to store system data, and the data area 4022 is used to store user data.

Further, the flash storage array 402 may be divided into three parts: a static SLC cache area A, a dynamic SLC cache area B, and TLC storage space C. The static SLC cache area A may be used in the system area 4021 and the data area 4022, and the dynamic SLC cache area B is generally used in the data area 4022. For ease of understanding, the following separately describes in detail a static SLC cache area, a dynamic SLC cache area, and TLC storage space.

1. Static SLC Cache Area

When a product is initialized, a specified flash storage area is allocated in a storage area. During a service life of the product, the specified flash storage area is fixedly used as an SLC cache area. In addition, the static SLC cache area is used to receive a write request delivered by the system file (host), write data corresponding to the write request into the static SLC cache area, and then move the data to the TLC storage space at appropriate time.

2. Dynamic SLC Cache Area

No specific area is fixedly configured as the SLC cache area. All areas that can be used to store the user data in the flash storage space may be temporarily configured as the SLC cache area. In addition, the dynamic SLC cache area is used to receive the write request delivered by the system file (host), and write the data corresponding to the write request to the dynamic SLC cache area.

It may also be understood that different SLC cache policies may be set for different partitions (the system area 4021 and the data area 4022) of the flash storage array 402. The static SLC cache area A may be configured in the system area 4021, and the SLC static cache area A and the dynamic SLC cache area B may be configured in the data area 4022.

In this embodiment, a dynamically configurable medium mode is used, and the dynamic SLC cache area is set, so that a high write speed can be provided to receive the write request of the host, and a read request of the host can be hit at a specific probability, thereby improving a response speed.

However, this solution still has some disadvantages. In one aspect, the static SLC cache area configured in this solution is a fixed configuration, so that the static SLC cache area can be used as only an SLC cache, and cannot be switched to a common user data storage area to store user data, resulting in large space losses. Generally, the SLC static cache area can be configured in only a small range (usually 1 GB to 2 GB) and can receive only write requests of a few bursts. A read request cannot be hit, and the SLC static cache area can only be used as a write buffer. In another aspect, although there is no need to configure a fixed area for the dynamic SLC cache area configured in this solution, a size of the dynamic SLC cache area is much greater than that of the static SLC cache area. However, because a component cannot perceive a scenario and behavior of a system, before the read request is hit, user data may have been reclaimed from the SLC dynamic cache to the TLC storage space. As a result, a read request hit probability is low. In addition, in write scenarios, it is difficult to identify when data is directly written into the TLC storage space (bypassing the SLC cache). As a result, data is written into the SLC cache first, and then, the data is immediately migrated to the TLC storage space. As a result, the data is written twice in a short period of time. This introduces write amplification and reduces write performance. In addition, in addition to a flow that originally needs to support the TLC storage space, a corresponding flow is also required in the cache area. As a result, the process may further incur additional flow overheads.

For the foregoing problem, an embodiment of this application provides storage space (a cache area) invisible to a user, to cache user data.

Figure 5:
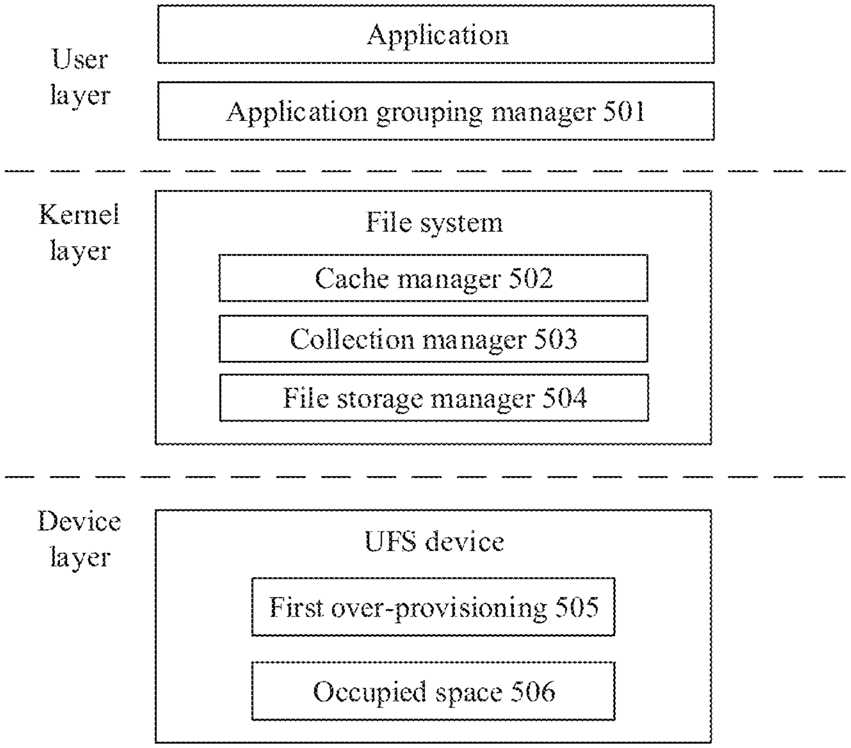
FIG. 5 is a block diagram of a software structure of a storage apparatus according to an embodiment of this application.

For example, FIG. 5 is a block diagram of a software structure of a storage apparatus 500 according to an embodiment of this application. In a layered architecture, software is divided into several layers, and each layer has a clear role and task. The layers communicate with each other through a software interface. In some embodiments, the system is divided into three layers: a user layer, a kernel layer, and a device layer from top to bottom. The user layer may include an application.

Optionally, the application may include applications such as Camera, Gallery, Calendar, Phone, Map, Navigation, WLAN, Bluetooth, Music, Video, and Messages.

As shown in FIG. 5, the user layer of the storage apparatus 500 includes an application (APP) and an application grouping manager 501.

The application grouping manager 501 is configured to group the APP based on first information corresponding to the APP, and is further configured to determine, based on grouping information of the APP, second information corresponding to a request message (I/O request: when an upper layer program communicates with a driver, the upper layer sends an I/O request, that is, an input/output request package (I/O request package)) delivered by the APP.

The request message delivered by the APP carries related communication data (for example, user data).

Optionally, the first information corresponding to the APP includes one or more of priority information of the APP, behavior information of the APP, and attribute information of the APP. In addition, the first information of the APP may further include other information related to the APP. This is not limited in this application.

More specifically, the priority information of the APP refers to a priority of the APP in a plurality of APPS, and the priority may be a system default priority, or may be preset by a user based on an actual situation. The behavior information of the APP refers to information related to an operation that is to be performed by the APP or an operation that can be performed by the APP. The attribute information of the APP refers to an attribute of the APP, for example, a category of the APP, whether the APP is a key APP, or whether the APP is a system APP.

Optionally, the second information corresponding to the I/O request includes one or more of priority information of the I/O request, foreground or background information of the I/O request, and cold or hot attribute information of the I/O request. In addition, the second information may further include other information related to the I/O request. This is not limited in this application.

Optionally, APPs may be classified into a first group, a second group, and a third group. The first group includes an APP with a high priority, an APP whose cold or hot attribute is hot, an APP whose behavior information is a specific behavior, a foreground/key APP, and the like. The third group includes an APP with a low priority, an APP whose cold or hot attribute is cold, an APP whose behavior information is a non-specific behavior, a background/non-key APP, and the like. The second group includes an APP that is included in neither the first group nor the third group.

Similarly, optionally, request messages corresponding to the APPs may be classified into a first category, a second category, and a third category. The first category includes the following characteristic: The behavior information is a specific behavior. The second category includes the following characteristic: The behavior information is a non-specific behavior. The second category further includes one or more of the following characteristics: A priority is high, a cold or hot attribute is hot, a corresponding APP is a foreground APP, and the corresponding APP is a key APP. The third category includes the following characteristic: The behavior information is a non-specific behavior. The third category further includes one or more of the following characteristics: A priority is low, a cold or hot attribute is cold, a corresponding APP is a background APP, and the corresponding APP is a non-key APP.

Optionally, it may be understood as that if it is determined that the category of the request message is not the third category, the user data carried in the request message is written into the cache area.

As shown in FIG. 5, at the device layer of the storage apparatus 500, storage space of a flash storage device includes first over-provisioning (OP) 505 and occupied space 506. The first over-provisioning 505 is redundant over-provisioning in over-provisioning included in the storage space of the flash storage device.

Optionally, the first OP may be the over-provisioning included in the storage space of the flash storage device, or may be a part of the over-provisioning included in the storage space of the flash storage device.

Optionally, the first OP 505 includes a static cache area (for example, a static SLC cache area) of the flash storage device.

Optionally, the static cache area may alternatively be a QLC cache area, a TLC cache area, or an MLC cache area.

As shown in FIG. 5, the kernel layer of the storage apparatus 500 includes a file system, and specifically includes: a cache manager 502, a collection manager 503, and a file storage manager 504.

The cache manager 502 is configured to receive the first OP 505 provided by the device layer, and combine the first OP 505 and OP of the cache manager 502 into first cache space (cache area) for unified management. The cache manager 502 is further configured to determine, based on the second information corresponding to the I/O request and a usage status of the first cache space, a proper cache policy for data carried in the I/O request.

Optionally, the cache area may be any one of the single-level cell SLC cache area, the multi-level cell MLC cache area, the triple-level cell TLC cache area, and the quad-level cell QLC cache area.

Specifically, when a storage medium configured at the device layer is a QLC, the cache area may be any one of the TLC cache area, the MLC cache area, and the SLC cache area, where the SLC cache area refers to a cache area configured with an SLC write manner, the MLC cache area refers to a cache area configured with an MLC write manner, and the TLC cache area refers to a cache area configured with a TLC write manner;

when the storage medium configured at the device layer is a TLC, the cache area may be either the MLC cache area or the SLC cache area; or when the storage medium configured at the device layer is an MLC, the cache area may be the SLC cache area.

It should be understood that when a storage medium configured at the device layer in the future is a flash medium with higher density, the cache area may be configured as a cache area with any flash medium write manner with lower density than that of the flash medium with higher density. The collection manager 503 is configured to properly transfer data cached in the cache area to a file storage area. The file storage manager 504 is configured to manage file storage in the file storage area.

In this embodiment of this application, the static cache area on the flash storage device side is canceled, redundant over-provisioning of the flash storage device is reported to the file system, and the redundant over-provisioning of the flash storage device and over-provisioning of the file system are integrated into storage space invisible to the user, so that the file system performs unified configuration, and the redundant over-provisioning can be used for caching the user data. This can improve storage space utilization and storage efficiency. In addition, a user scenario can be perceived based on the grouping information of the application, to provide a more proper cache policy for the user data, thereby ensuring full-time high-speed write of a key application and high-speed read of a key scenario (for example, the application is switched from a background to a foreground).

Figure 6:
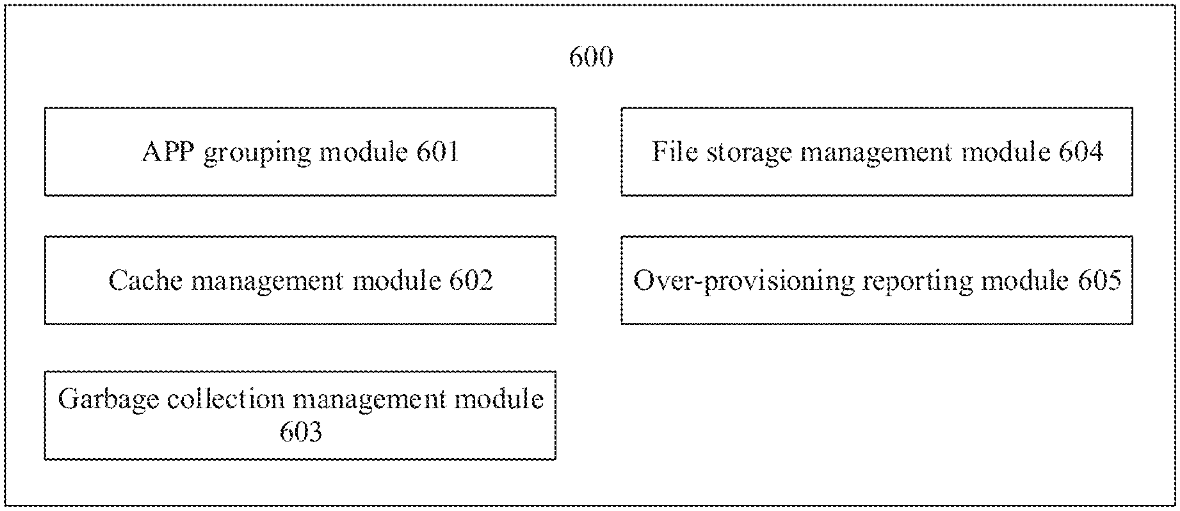
FIG. 6 is a diagram of functional modules of a storage apparatus according to an embodiment of this application.

For example, FIG. 6 is a diagram of functional modules of a storage apparatus 600 according to an embodiment of this application. As shown in FIG. 6, the apparatus 600 includes an APP grouping module 601, a cache management module 602, a garbage collection management module 603, a file storage management module 604, and an over-provisioning reporting module 605. The details are as follows:

The APP grouping module 601 is configured to group an APP based on first information corresponding to the APP, and is further configured to determine, based on grouping information of the APP, second information corresponding to a request message (an I/O request) delivered by the APP.

The request message delivered by the APP carries communication data (such as user data) delivered by the APP.

Optionally, the first information corresponding to the APP includes one or more of priority information of the APP, behavior information of the APP, and attribute information of the APP. In addition, the first information corresponding to the APP may further include other information related to the APP. This is not limited in this application.

More specifically, the priority information of the APP refers to a priority of the APP in a plurality of APPS, and the priority may be a system default priority, or may be preset by a user based on an actual situation. The behavior information of the APP refers to information related to an operation that is to be performed by the APP or an operation that can be performed by the APP. The attribute information of the APP refers to an attribute of the APP, for example, a category of the APP, whether the APP is a key APP, or whether the APP is a system APP.

Optionally, the second information corresponding to the I/O request (user data delivered by the APP) includes one or more of priority information of the I/O request, foreground or background information of the I/O request, and cold or hot attribute information of the I/O request. In addition, the second information may further include other information related to the I/O request (user data delivered by the APP). This is not limited in this application.

The over-provisioning reporting module 605 is configured to report first over-provisioning OP of a flash storage device to the cache management module 602. The first OP is redundant over-provisioning in over-provisioning included in storage space of the flash storage device.

Optionally, the first OP may be the over-provisioning included in the storage space of the flash storage device, or may be a part of the over-provisioning included in the storage space of the flash storage device.

Optionally, the first OP reported by the over-provisioning reporting module 605 to the cache management module 602 carries bad block information of the first OP.

It should be noted that in this embodiment of this application, the reported first OP is actually information about the reported first OP.

Optionally, the information about the first OP includes space storage information of the first OP, for example, a performance parameter like a size of available storage space, and may further include the bad block information of the first OP.

Optionally, the over-provisioning reporting module 605 is further configured to divide the storage space of the flash storage device into over-provisioning and occupied space, and may be further configured to further divide the first OP from the over-provisioning.

It should be understood that in this embodiment of this application, that the over-provisioning reporting module 605 reports the reserved storage space of the flash storage device to the cache management module 602 means that no static cache area (for example, a static SLC cache area) is configured in the storage space of the flash storage device.

The cache management module 602 is configured to receive the first OP reported by the over-provisioning reporting module 605, and combine the first OP with over-provisioning OP of the file system into first storage space (cache area) for unified management.

Optionally, the OP of the file system may be one or more of idle space reserved by a flash-friendly file system (F2FS), idle space obtained through file compression, and idle space obtained through file deduplication. In addition, the OP of the file system may alternatively be other idle space of the file system. This is not limited in this application.

Optionally, the first OP reported by the over-provisioning reporting module 605 to the cache management module 602 carries the bad block information of the first OP. In a system running process, bad block synchronization needs to be performed on the bad block information of first OP in the first cache space (cache area).

The cache management module 602 is further configured to perceive an application scenario of the user based on the grouping information of the APP and the first information corresponding to the APP.

Specifically, the cache management module 602 is specifically configured to perceive the application scenario of the user based on the second information corresponding to the I/O request.

Optionally, the cache management module 602 is specifically configured to determine a proper cache policy for the I/O request based on the second information corresponding to the I/O request and a usage status of the first cache space.

In a possible implementation, if currently available SLC cache space is greater than or equal to a first threshold, all user data corresponding to the APP is written into the cache area.

Optionally, the first threshold may be one fourth of the first cache space (cache area). In addition, the first threshold may alternatively be another specified value, for example, may be one fifth of the first cache space, and may be set based on an actual situation. This is not limited in this application.

In another possible implementation, if currently available cache space is less than the first threshold, a proper cache policy is determined based on an application scenario of the user. Specifically, a proper cache policy for the I/O request is determined based on the second information corresponding to the I/O request and the usage status of the first cache space.

In an example, if the cold or hot attribute information of the request message (user data) delivered by the APP is cold data, and/or a priority of the request message (user data) delivered by the APP is a low priority, the user data (carried in the request message) corresponding to the APP is directly written into a file storage area (TLC storage space) without passing through the cache area.

In another example, if the APP is a foreground APP and/or the APP is a key APP, the user data corresponding to the APP is written into the cache area without passing through the cache area.

Optionally, to facilitate a subsequent fast read operation, the user data corresponding to the APP is locked after being written into the cache area, so that the user data does not flow into the file storage area.

The garbage collection management module 603 is configured to properly transfer data cached in the cache area to the file storage area.

Optionally, the garbage collection management module 603 is specifically configured to: when storage space of the cache area is insufficient, properly transfer the data cached in the cache area to the file storage area in time.

The file storage management module 604 is configured to manage file storage in the file storage area.

In this embodiment of this application, a static cache area on the flash storage device side is canceled, a part or all of the over-provisioning of the flash storage device is reported to the file system, and the part or all of the over-provisioning of the flash storage device and the over-provisioning of the file system are integrated into storage space invisible to the user, so that the file system performs unified configuration, and the redundant over-provisioning can be used for caching applications. This can improve storage space utilization and storage efficiency. In addition, a user scenario can be perceived based on the grouping information of the application, to provide a more proper cache policy for the user data, thereby ensuring full-time high-speed write of a key application and high-speed read of a key scenario (for example, the application is switched from a background to a foreground).

Figure 7:
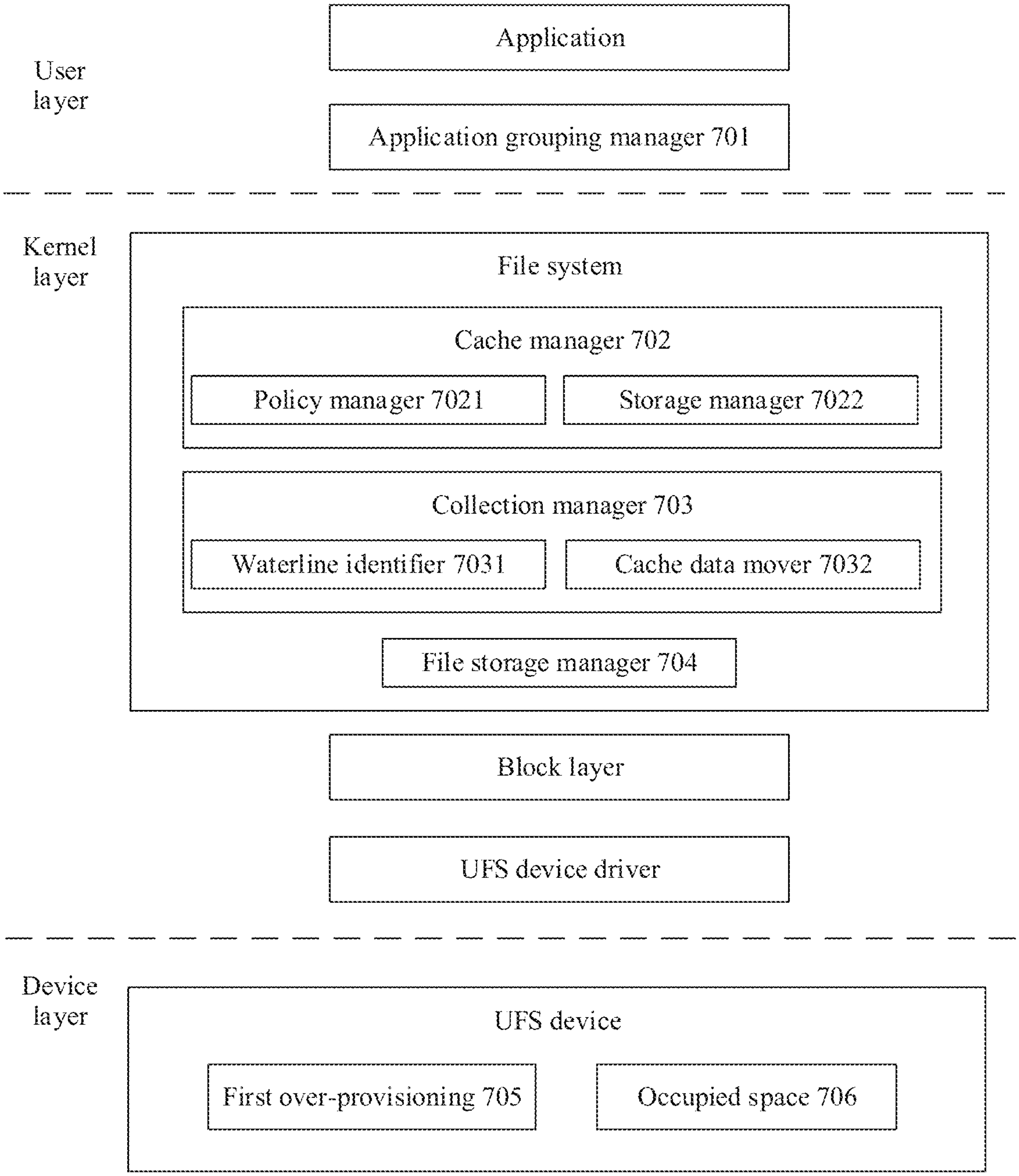
FIG. 7 is a block diagram of a software structure of another storage apparatus according to an embodiment of this application.

Based on the embodiment shown in FIG. 5, for example, FIG. 7 is a block diagram of a software structure of a storage apparatus 700 according to an embodiment of this application. In a layered architecture, software is divided into several layers, and each layer has a clear role and task. The layers communicate with each other through a software interface. In some embodiments, the system is divided into three layers: a user layer, a kernel layer, and a device layer from top to bottom. The user layer may include an application.

Optionally, the application may include applications such as Camera, Gallery, Calendar, Phone, Map, Navigation, WLAN, Bluetooth, Music, Video, and Messages.

As shown in FIG. 7, the user layer of the storage apparatus 700 includes an application (APP) and an application grouping manager 701.

The application grouping manager 701 is configured to group an APP based on first information corresponding to the APP, and is further configured to determine, based on grouping information of the APP, second information corresponding to request data (I/O) delivered by the APP.

Optionally, the first information corresponding to the APP includes one or more of priority information of the APP, behavior information of the APP, and attribute information of the APP. In addition, the first information of the APP may further include other information related to the APP. This is not limited in this application.

More specifically, the priority information of the APP refers to a priority of the APP in a plurality of APPS, and the priority may be a system default priority, or may be preset by a user based on an actual situation. The behavior information of the APP refers to information related to an operation that is to be performed by the APP or an operation that can be performed by the APP. The attribute information of the APP refers to an attribute of the APP, for example, a category of the APP, whether the APP is a key APP, or whether the APP is a system APP.

Optionally, the second information corresponding to the I/O request includes one or more of priority information of the I/O request, foreground or background information of the I/O request, and cold or hot attribute information of the I/O request. In addition, the second information may further include other information related to the I/O request. This is not limited in this application.

Optionally, APPs may be classified into a first group, a second group, and a third group. The first group includes an APP with a high priority, an APP whose cold or hot attribute is hot, an APP whose behavior information is a specific behavior, a foreground/key APP, and the like. The third group includes an APP with a low priority, an APP whose cold or hot attribute is cold, an APP whose behavior information is a non-specific behavior, a background/non-key APP, and the like. The second group includes an APP between the first group and the third group.

Similarly, optionally, request messages (carrying user data delivered by the APPs) corresponding to the APPs may be classified into a first category, a second category, and a third category. The first category includes the following characteristic: The behavior information is a specific behavior. The second category includes the following characteristic: The behavior information is a non-specific behavior. The second category further includes one or more of the following characteristics: A priority is high, a cold or hot attribute is hot, a corresponding APP is a foreground APP, and the corresponding APP is a key APP. The third category includes the following characteristic: The behavior information is a non-specific behavior. The third category further includes one or more of the following characteristics: A priority is low, a cold or hot attribute is cold, a corresponding APP is a background APP, and the corresponding APP is a non-key APP.

Optionally, it may be understood as that if it is determined that the category of the request message is not the third category, the user data carried in the request message is written into a cache area.

As shown in FIG. 7, at the device layer of the storage apparatus 700, storage space of a flash storage device includes first over-provisioning 705 and occupied space 706. The first OP is redundant over-provisioning in over-provisioning included in the storage space of the flash storage device.

Optionally, the first OP may be the over-provisioning included in the storage space of the flash storage device, or may be a part of the over-provisioning included in the storage space of the flash storage device.

As shown in FIG. 7, the kernel layer of the storage apparatus 700 includes a file system, and specifically includes: a cache manager 702, a collection manager 703, and a file storage manager 704. The cache manager 702 includes a policy manager 7021 and a storage manager 7022. The collection manager 703 includes a waterline identifier 7031 and a cache data mover 7032. Details are as follows.

The storage manager 7022 is configured to receive the first over-provisioning 705 provided by the device layer, and combine the first over-provisioning 705 with over-provisioning of the file system into first cache space (cache area) for unified management.

The policy manager 7021 is configured to determine, based on the second information corresponding to the I/O request and/or a usage status of the first cache space, a proper cache policy for communication data carried in the I/O request.

The waterline identifier 7031 is configured to determine current available space of the cache area.

The cache data mover 7032 is configured to properly transfer data cached in the cache area to a file storage area when the current available space of the cache area is insufficient.

The file storage manager 704 is configured to manage file storage in the file storage area.

Figure 8:
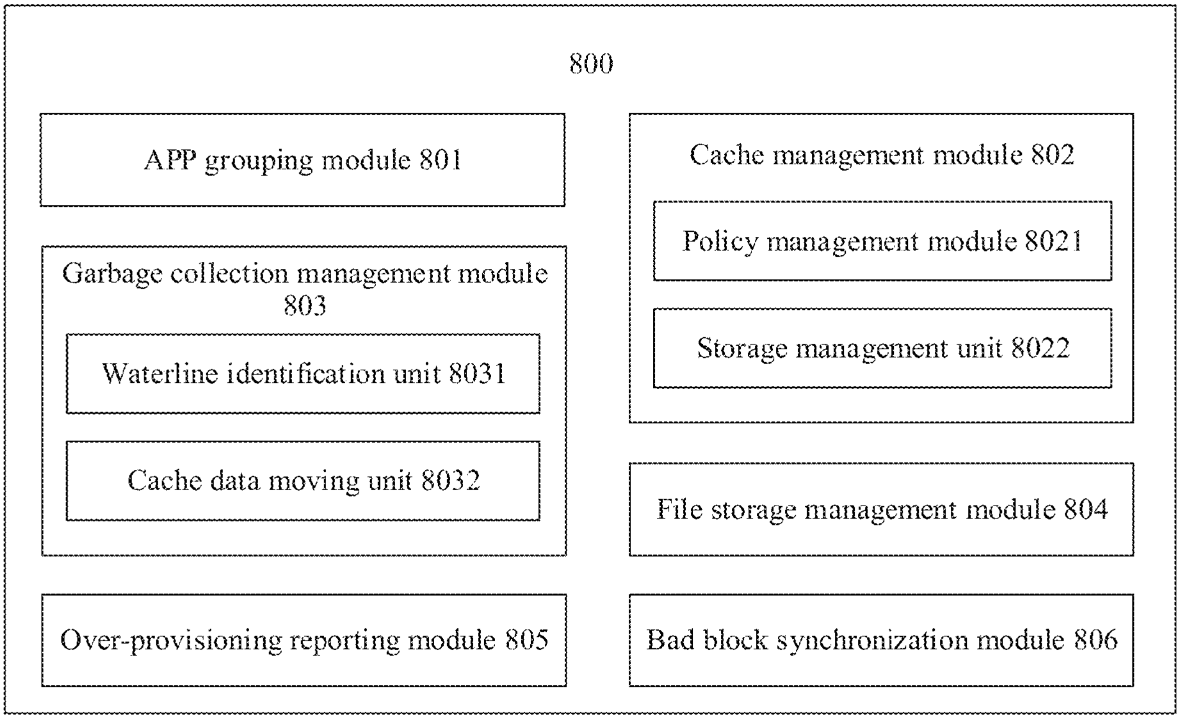
FIG. 8 is a diagram of functional modules of another storage apparatus according to an embodiment of this application.

Based on the embodiment shown in FIG. 6, corresponding to the embodiment shown in FIG. 7, for example, FIG. 8 is a diagram of functional modules of a storage apparatus 800 according to an embodiment of this application. As shown in FIG. 8, the apparatus 800 includes an APP grouping module 801, a cache management module 802, a garbage collection management module 803, a file storage management module 804, an over-provisioning reporting module 805, and a bad block synchronization module 806. The details are as follows:

The APP grouping module 801 is configured to group an APP based on first information corresponding to the APP, and is further configured to determine, based on grouping information of the APP, second information corresponding to a request message (I/O request) delivered by the APP.

The request message (I/O request) delivered by the APP carries user data delivered by the APP.

Optionally, the first information corresponding to the APP includes one or more of priority information of the APP, behavior information of the APP, and attribute information of the APP. In addition, the first information of the APP may further include other information related to the APP. This is not limited in this application.

More specifically, the priority information of the APP refers to a priority of the APP in a plurality of APPS, and the priority may be a system default priority, or may be preset by a user based on an actual situation. The behavior information of the APP refers to information related to an operation that is to be performed by the APP or an operation that can be performed by the APP. The attribute information of the APP refers to an attribute of the APP, for example, a category of the APP, whether the APP is a key APP, or whether the APP is a system APP.

Optionally, the second information corresponding to the I/O request includes one or more of priority information of the I/O request, foreground or background information of the I/O request, and cold or hot attribute information of the I/O request. In addition, the second information may further include other information related to the I/O request. This is not limited in this application.

Optionally, APPs may be classified into a first group, a second group, and a third group. The first group includes an APP with a high priority, an APP whose cold or hot attribute is hot, an APP whose behavior information is a specific behavior, a foreground/key APP, and the like. The third group includes an APP with a low priority, an APP whose cold or hot attribute is cold, an APP whose behavior information is a non-specific behavior, a background/non-key APP, and the like. The second group includes an APP between the first group and the third group.

Similarly, optionally, request messages (user data) corresponding to the APPs may be classified into a first category, a second category, and a third category. The first category includes the following characteristic: The behavior information is a specific behavior. The second category includes the following characteristic: The behavior information is a non-specific behavior. The second category further includes one or more of the following characteristics: A priority is high, a cold or hot attribute is hot, a corresponding APP is a foreground APP, and the corresponding APP is a key APP. The third category includes the following characteristic: The behavior information is a non-specific behavior. The third category further includes one or more of the following characteristics: A priority is low, a cold or hot attribute is cold, a corresponding APP is a background APP, and the corresponding APP is a non-key APP.

Optionally, it may be understood as that if it is determined that the category of the request message is not the third category, the user data carried in the request message is written into a cache area.

The over-provisioning reporting module 805 is configured to report first over-provisioning OP of a flash storage device to the cache management module 802. The first OP is redundant over-provisioning in over-provisioning included in storage space of the flash storage device.

Optionally, the first OP may be the over-provisioning included in the storage space of the flash storage device, or may be a part of the over-provisioning included in the storage space of the flash storage device.

Optionally, the first OP reported by the over-provisioning reporting module 805 to the cache management module 802 carries bad block information of the first OP.

Optionally, the over-provisioning reporting module 805 is further configured to divide the storage space of the flash storage device into over-provisioning and occupied space, and may be further configured to further divide the first OP from the over-provisioning.

Specifically, when the storage apparatus 800 is used for the first time, the flash storage device divides proper over-provisioning (OP space) based on a data partition size of a system file and total space of a flash particle. The over-provisioning includes an area (for example, a static SLC cache area) originally used for static caching.

It should be understood that, in this embodiment of this application, that the over-provisioning reporting module 805 reports the first OP of the flash storage device to the cache management module 802 means that no static cache area is configured in the storage space of the flash storage device.

Optionally, the flash storage device may be a universal flash storage (UFS) device.

The bad block synchronization module 806 is configured to: when a bad block occurs in the first OP reported by the over-provisioning reporting module 805 to the cache management module 802 in a use process, report corresponding bad block information to the file system (the cache management module 802) in time, and reduce cache space synchronously.

The cache management module 802 is configured to receive the first OP reported by the over-provisioning reporting module 805, and combine the first OP with over-provisioning of the file system into first cache space (cache area) for unified management.

Specifically, a storage management unit 8022 located in the cache management module 802 is configured to receive the first OP reported by the over-provisioning reporting module 805, and combine the first OP with the over-provisioning of the file system into the first cache space (cache area) for unified management.

It should be understood that the first cache space is used as a cache area. The cache area is a virtual cache area and is invisible to the user. In addition, after the cache area is formed for the first time, a size of the cache area remains unchanged within a period of use time.

Optionally, the cache area is used for caching user data.

Optionally, the over-provisioning of the file system may be one or more of idle space reserved by a flash-friendly file system (F2FS), idle space obtained through file compression, and idle space obtained through file deduplication. In addition, the over-provisioning of the file system may be other idle space of the file system. This is not limited in this application.

Specifically, when the storage apparatus 800 is used for the first time, proper over-provisioning OP is divided by the flash storage device based on a data partition size of the file system and total space of a flash particle, and then reports the first OP included in the OP to the cache management module. The OP includes a static cache area (for example, an SLC static cache area) originally used for static cache.

In addition, if the file system enables file deduplication or compression, space saved after deduplication or compression may also be used as cache space, that is, the OP of the file system.

Optionally, the first OP reported by the over-provisioning reporting module 805 to the cache management module 802 carries the bad block information of the first OP.

Optionally, in a running process of the system, the cache management module 802 receives the bad block information of the first OP sent by the bad block synchronization module 806, and performs bad block synchronization on the cache space based on the bad block information, to synchronously reduce the cache space.

The cache management module 802 is further configured to perceive an application scenario of the user based on the grouping information of the APP and the first information corresponding to the APP.

Specifically, the cache management module 802 is specifically configured to perceive the application scenario of the user based on the second information corresponding to the I/O request.

Optionally, the cache management module 802 is specifically configured to determine a proper cache policy for the I/O request based on the second information corresponding to the I/O request and a usage status of the first cache space.

In a possible implementation, if currently available cache space is greater than or equal to a first threshold, all user data corresponding to the APP is written into the cache area.

Optionally, the first threshold may be one fourth of the first cache space. In addition, the first threshold may be another specified value, for example, may be one fifth of the first cache space. The first threshold may be set based on an actual situation. This is not limited in this application.

In another possible implementation, if currently available cache space is less than the first threshold, a proper cache policy is determined based on an application scenario of the user. Specifically, a proper SLC cache policy for communication data (user data) carried in the I/O request is determined based on the second information corresponding to the I/O request and the usage status of the first cache space.

In an example, if the cold or hot attribute information of the I/O request delivered by the APP is cold data, and/or the priority of the I/O request delivered by the APP is a low priority, the user data carried in the I/O request is directly written into a file storage area (TLC storage space) without passing through the cache area.

In another example, if the APP is a foreground APP and/or the APP is a key APP, the user data carried in the I/O request delivered by the APP is written into the cache area without passing through the cache area.

Optionally, to facilitate a subsequent fast read operation, the user data is locked after being written into the cache area, so that the user data does not flow into the file storage area.

The garbage collection management module 803 is configured to properly transfer data cached in the cache area to the file storage area.

Specifically, a waterline identification unit 8031 located in the garbage collection management module 803 is configured to determine current available space of the cache area.

The cache data moving unit 8032 located in the garbage collection management module 803 is configured to properly transfer data cached in the cache area to the file storage area when the current available space of the cache area is insufficient.

Optionally, when the I/O is idle, the garbage collection management module 803 selects a block of a cold data flow, and moves data in the cache into the file storage area.

Optionally, when the I/O is busy and currently available cache space is insufficient, the garbage collection management module 803 migrates the data in the cache into the file storage area according to a Greedy algorithm.

The file storage management module 804 is configured to manage file storage in the file storage area.

In this embodiment of this application, the static cache area on the flash storage device side is canceled, redundant over-provisioning of the flash storage device is reported to the file system, and the redundant over-provisioning of the flash storage device and the over-provisioning of the file system are integrated into storage space invisible to the user, so that the file system performs unified configuration, and the redundant over-provisioning can be used for caching applications. This can improve storage space utilization and storage efficiency. In addition, a user scenario can be perceived based on the grouping information of the application, to provide a more proper cache policy for the user data, thereby ensuring full-time high-speed write of a key application and high-speed read of a key scenario (for example, the application is switched from a background to a foreground).

Figure 9:
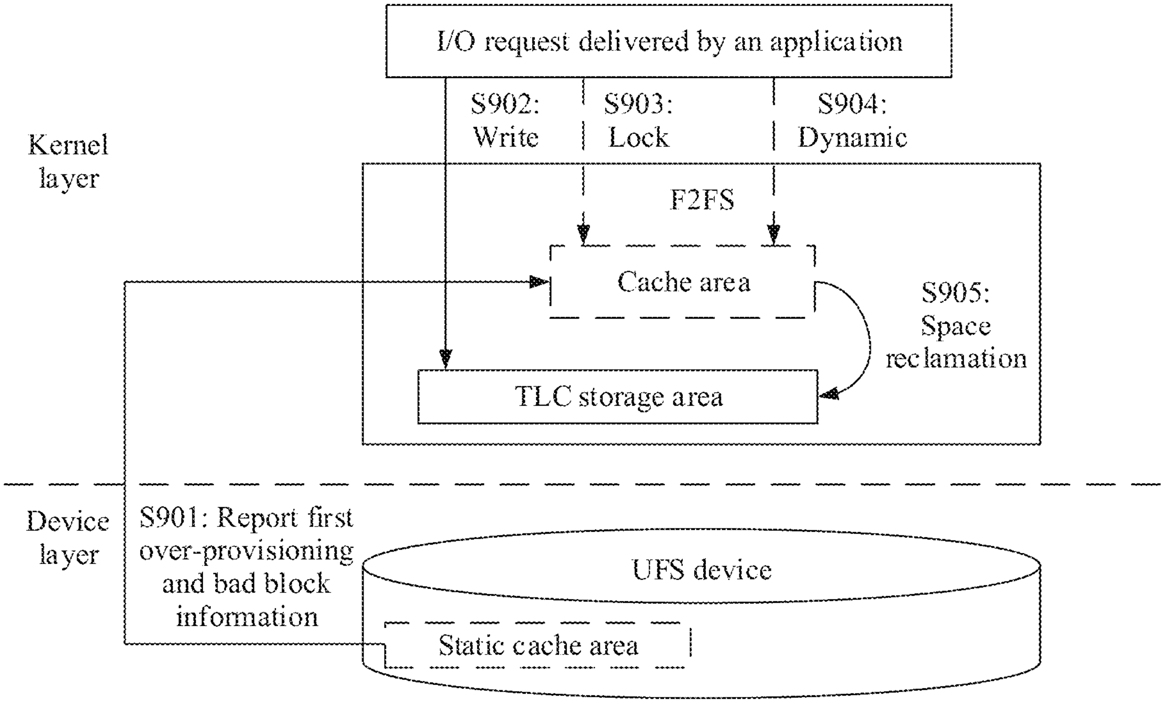
FIG. 9 is a schematic flowchart of a storage method according to an embodiment of this application.

For example, FIG. 9 is a diagram of a storage method 900 according to an embodiment of this application. As shown in FIG. 9, the method 900 includes the following steps.

S901: A flash storage device cancels a static cache area in cache space of the flash storage device, divides the cache space of the flash storage device to obtain redundant over-provisioning OP (first over-provisioning), and reports the first OP to a file system. The first OP is redundant over-provisioning in over-provisioning included in storage space of the flash storage device.

Optionally, the first OP may be the over-provisioning included in the storage space of the flash storage device, or may be a part of the over-provisioning included in the storage space of the flash storage device.

The over-provisioning of the flash storage device includes an original static cache area.

Optionally, the flash storage device further reports bad block information of the first OP to the file system, so that bad block synchronization is performed in a cache area in the file system. The bad block information may be information carried in the first OP of the flash storage device, or may be separate information.

S902 to S904: A corresponding cache policy may be configured for user data based on a category of an I/O request delivered by an APP. The cache policy includes: directly storing, in a TLC storage area, the user data carried in the I/O request; storing, in the cache area, the user data carried in the I/O request, and locking the user data in the cache area; or storing, in the cache area, the user data carried in the I/O request, and not locking the user data.

S905: When available space of the cache area is less than a second threshold, properly migrate the user data cached in the cache area to the TLC storage area.

The second threshold may be ⅙ of the cache area, or may be a value preset based on an actual situation, for example, may be ⅐ of the cache area. This is not limited in this application.

Optionally, properly migrating the user data cached in the cache area to the TLC storage area may be specifically migrating unlocked user data cached in the cache area (user data carried in a second-type I/O request in the embodiment shown in FIG. 8) to the TLC storage area.

Figure 10:
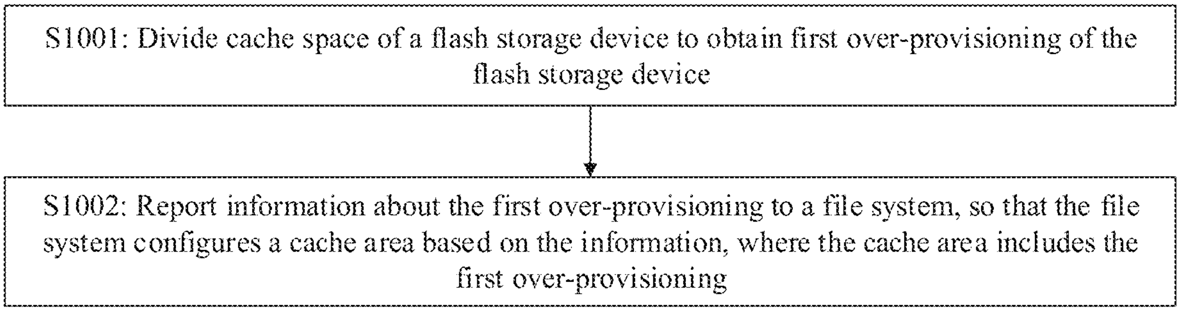
FIG. 10 is a schematic flowchart of a storage method according to an embodiment of this application.

For example, FIG. 10 is a schematic flowchart of a storage method 1000 according to an embodiment of this application. As shown in FIG. 10, the method 1000 includes the following steps.

S1001: Divide cache space of a flash storage device to obtain first over-provisioning OP of the flash storage device. The first OP is redundant over-provisioning in over-provisioning included in storage space of the flash storage device.

Optionally, the first OP may be the over-provisioning included in the storage space of the flash storage device, or may be a part of the over-provisioning included in the storage space of the flash storage device.

Specifically, the flash storage device cancels a static cache area in the storage space of the flash storage device, and the over-provisioning of the flash storage device includes the static cache area.

Optionally, the flash storage device may be a UFS device.

S1002: Report the first OP of the flash storage device to a file system, so that the file system configures a cache area based on the information, where the cache area includes the first OP.

Optionally, the file system obtains over-provisioning of the file system through compression, deduplication, or the like, and both the over-provisioning of the file system and the first OP of the flash storage device are used as the cache area. In other words, the cache area includes two parts: one part is the first OP of the flash storage device, and the other part is the OP of the file system.

It should be understood that the cache area is a virtual area, is invisible to a user, and may be used as a cache of user data.

In this embodiment of this application, the static cache area on the flash storage device side is canceled, and the redundant over-provisioning of the flash storage device is reported to the file system. The redundant over-provisioning of the flash storage device and the over-provisioning of the file system are integrated into storage space invisible to the user, so that the file system performs unified configuration, and the redundant over-provisioning can be used for caching user data. This can improve storage space utilization and storage efficiency.

Figure 11:
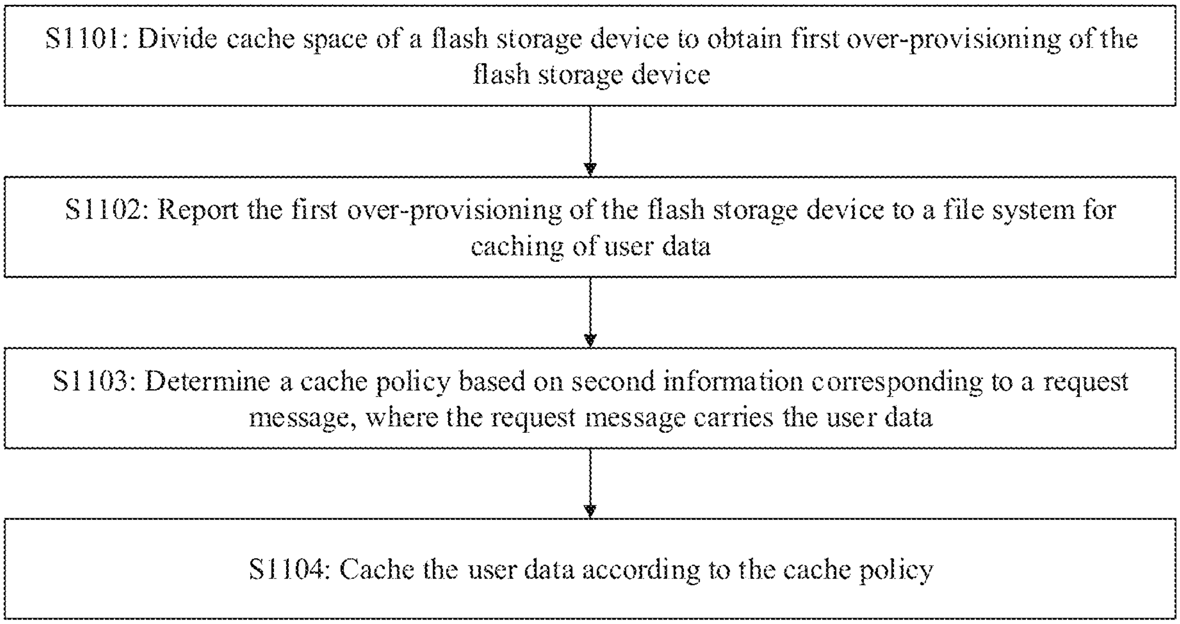
FIG. 11 is a schematic flowchart of another storage method according to an embodiment of this application.

Based on the embodiment shown in FIG. 10, for example, FIG. 11 is a schematic flowchart of a storage method 1100 according to an embodiment of this application. As shown in FIG. 11, the method 1100 includes the following steps.

S1101 and S1102 are the same as S1001 and S1002 in the embodiment shown in FIG. 10. For brevity, details are not described herein again.

S1103: Determine a cache policy based on second information corresponding to a request message.

Explanations of the second information corresponding to the request message have been described in detail in the embodiments shown in FIG. 5 to FIG. 8. For brevity, details are not described herein again.

Optionally, APPs may be classified into a first group, a second group, and a third group. The first group includes an APP with a high priority, an APP whose cold or hot attribute is hot, an APP whose behavior information is a specific behavior, a foreground/key APP, and the like. The third group includes an APP with a low priority, an APP whose cold or hot attribute is cold, an APP whose behavior information is a non-specific behavior, a background/non-key APP, and the like. The second group includes an APP between the first group and the third group.

Similarly, optionally, request messages delivered by the APPs may be classified into a first category, a second category, and a third category. The first category includes the following characteristic: The behavior information is a specific behavior. The second category includes the following characteristic: The behavior information is a non-specific behavior. The second category further includes one or more of the following characteristics: A priority is high, a cold or hot attribute is hot, a corresponding APP is a foreground APP, and the corresponding APP is a key APP. The third category includes the following characteristic: The behavior information is a non-specific behavior. The third category further includes one or more of the following characteristics: A priority is low, a cold or hot attribute is cold, a corresponding APP is a background APP, and the corresponding APP is a non-key APP.

Optionally, it may be understood as that if it is determined that the category of the request message is not the third category, the user data carried in the request message is written into a cache area.

Optionally, the cache policy includes: directly storing user data carried in a request message of the third category in the TLC storage area; storing user data carried in a request message of the first category in the cache area and locking the user data in the cache area; or storing the user data carried in a request message of the second category in the cache area without locking.

S1104: Cache the user data according to the cache policy.

In this embodiment of this application, a user scenario (the category of the request message) can be perceived based on grouping information of the application, to provide a more proper cache policy for the user data, thereby ensuring full-time high-speed write of a key application and high-speed read of a key scenario (for example, the application is switched from a background to a foreground).

Figure 12:
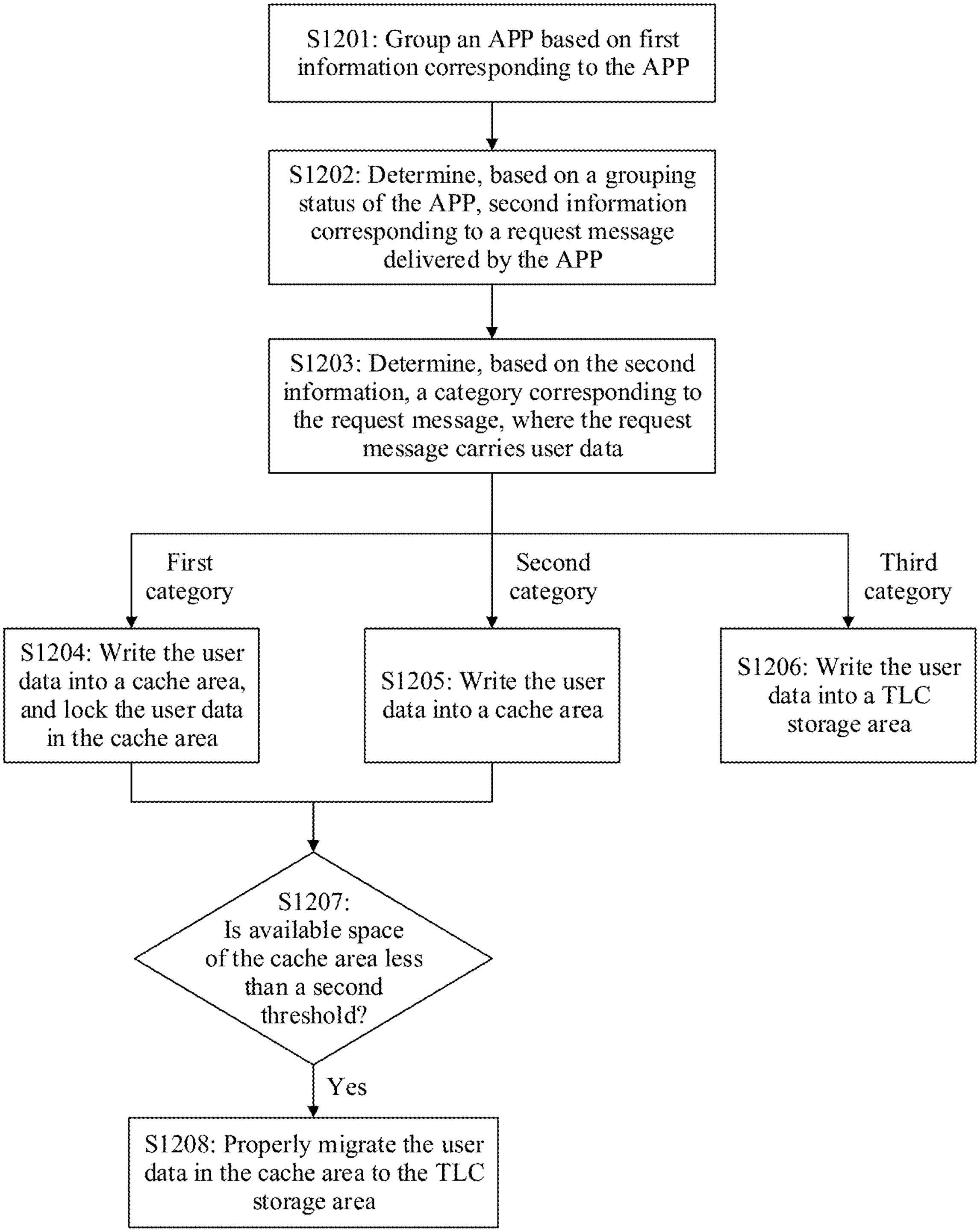
FIG. 12 is a schematic flowchart of a method for determining a cache policy according to an embodiment of this application.

To understand a cache policy determining process more clearly, for example, FIG. 12 is a schematic flowchart of a method 1200 for determining a cache policy according to an embodiment of this application. As shown in FIG. 12, the method 1200 includes the following steps.

S1201: Group an APP based on first information corresponding to the APP.

Explanations of the first information corresponding to the APP have been described in detail in embodiments shown in FIG. 5 to FIG. 8. For brevity, details are not described herein again.

Optionally, APPs may be classified into a first group, a second group, and a third group. The first group includes an APP with a high priority, an APP whose cold or hot attribute is hot, an APP whose behavior information is a specific behavior, a foreground/key APP, and the like. The third group includes an APP with a low priority, an APP whose cold or hot attribute is cold, an APP whose behavior information is a non-specific behavior, a background/non-key APP, and the like. The second group includes an APP between the first group and the third group.

S1202: Determine, based on a grouping status of the APP, second information corresponding to a request message delivered by the APP.

Optionally, the request message is an I/O request.

Explanations of the second information corresponding to the request message delivered by the APP are described in detail in the embodiments shown in FIG. 5 to FIG. 8. For brevity, details are not described herein again.

S1203: Determine, based on the second information corresponding to the request message, a category corresponding to the request message.

The request message delivered by the APP carries user data delivered by the APP.

Optionally, request messages delivered by the APPs may be classified into a first category, a second category, and a third category. The first category includes the following characteristic: The behavior information is a specific behavior. The second category includes the following characteristic: The behavior information is a non-specific behavior. The second category further includes one or more of the following characteristics: A priority is high, a cold or hot attribute is hot, a corresponding APP is a foreground APP, and the corresponding APP is a key APP. The third category includes the following characteristic: The behavior information is a non-specific behavior. The third category further includes one or more of the following characteristics: A priority is low, a cold or hot attribute is cold, a corresponding APP is a background APP, and the corresponding APP is a non-key APP.

Optionally, it may be understood as that if it is determined that the category of the request message is not the third category, the user data carried in the request message is written into a cache area.

S1204: When the category corresponding to the request message delivered by the APP is the first category, write the user data carried in the request message into the cache area, and lock the user data carried in the request message in the cache area.

It should be understood that, in a locking period, the locked user data is always in the cache area and does not flow into a TLC storage area.

S1205: When the category corresponding to the request message delivered by the APP is the second category, write the user data carried in the request message into the cache area.

It should be understood that, in this case, the user data is not locked.

S1206: When the category corresponding to the request message delivered by the APP is the third category, directly write the user data carried in the request message into the TLC storage area.

S1207: In a process of using the cache area, determine whether current available space of the cache area is less than a second threshold, and if the current available space of the cache area is less than the second threshold, perform step S1208.

The second threshold may be ⅙ of the cache area, or may be a value preset based on an actual situation, for example, may be ⅐ of the cache area. This is not limited in this application.

S1208: Properly migrate the user data cached in the cache area to the TLC storage space.

Optionally, properly migrating the user data cached in the cache area to the TLC storage area may be specifically migrating unlocked user data (the user data carried in the request message of the second category) cached in the cache area to the TLC storage area.

In this embodiment of this application, a proper cache policy is determined based on the category of the request message delivered by the APP, so that some user data of low importance (a cache does not need to be used) is directly written into the TLC storage area, thereby avoiding two times of storage of the user data in a short time, and further avoiding extra flow overheads. In addition, user data delivered by a key APP can be locked in the cache area, so that full-time high-speed write of the key application and high-speed read of a key scenario (for example, the application is switched from a background to a foreground) can be ensured, thereby improving user experience.

Figure 13:
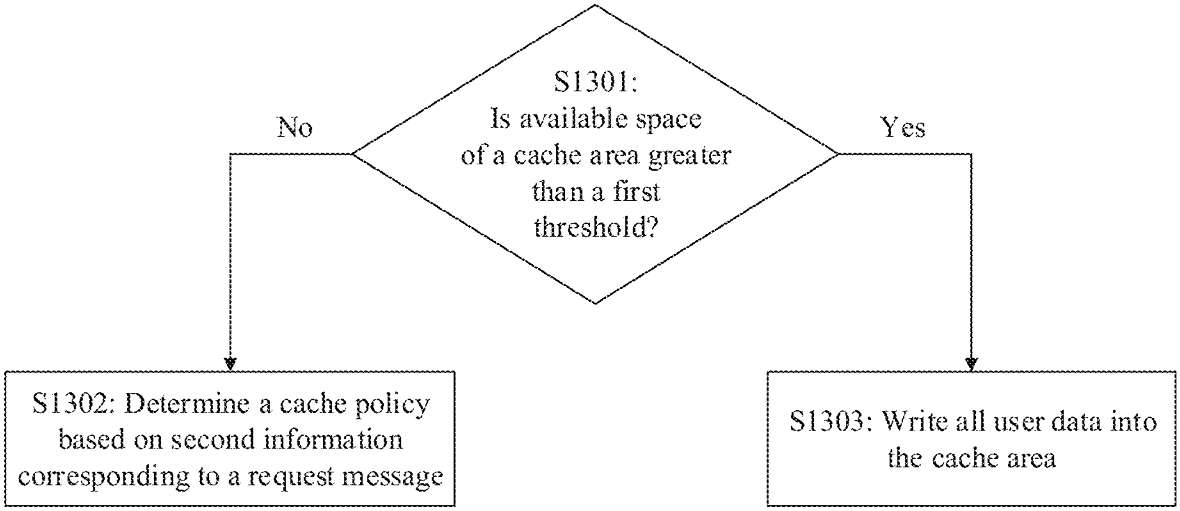
FIG. 13 is a schematic flowchart of another method for determining a cache policy according to an embodiment of this application.

Based on the embodiment shown in FIG. 12, for example, FIG. 13 is a schematic flowchart of another method for determining a cache policy according to an embodiment of this application. As shown in FIG. 13, the method 1300 includes the following steps.

S1301: Determine whether current available space of a cache area is greater than a first threshold; and if the current available space of the cache area is not greater than the first threshold, perform step S1302; or if the current available space of the cache area is greater than the first thresholds, perform step S1303.

Optionally, the first threshold may be one fourth of the cache area. In addition, the first threshold may alternatively be another specified value, for example, may be one fifth of the cache area. The first threshold may be set based on an actual situation. This is not limited in this application.

S1302: Determine a cache policy based on second information corresponding to a request message delivered by an APP.

A specific method for determining the cache policy in this step is the same as that in the embodiment shown in FIG. 12. For brevity, details are not described herein again.

The request message delivered by the APP carries user data delivered by the APP.

S1303: Write all user data delivered by the APP into the cache area.

In this embodiment of this application, when the current available space of the cache area is sufficient, a cache policy is not determined based on the second information (a category of the request message carrying the user data) corresponding to the request message delivered by the APP, but all the user data delivered by the APP is written into the cache area. This can further improve cache space utilization and cache efficiency, and improve use experience of the user.

An embodiment of this application further provides a computer-readable medium. The computer-readable medium stores computer program code, and when the computer program code is run on a computer, the computer is enabled to perform any method in FIG. 9 to FIG. 13.

An embodiment of this application further provides a chip, including at least one processor and a memory. The at least one processor is coupled to the memory, and is configured to read and execute instructions in the memory to perform any method in FIG. 9 to FIG. 13.

An embodiment of this application further provides an electronic device. The electronic device includes the storage apparatus shown in any one of FIG. 5 to FIG. 8, to perform any method in FIG. 9 to FIG. 13.

An embodiment of this application further provides an electronic device, including at least one processor and a memory. The at least one processor is coupled to the memory, and is configured to read and execute instructions in the memory to perform any method in FIG. 9 to FIG. 13.

The foregoing embodiments may be used separately, or may be used in combination to implement different technical effects.

It should be understood that the solutions provided in this application are not limited to a file system, and may also be applied to another data management program (for example, a database) having a flash medium. The solutions provided in this application are not limited to the field of intelligent terminals, and may also be applied to a corresponding service scenario in the field of servers.

One or more of the modules or units described in this specification may be implemented by software, hardware, or a combination thereof. When any one of the foregoing modules or units is implemented by software, the software exists in a form of a computer program instruction, and is stored in the memory. The processor may be configured to execute the program instruction and implement the foregoing method procedure. The processor may include but is not limited to, at least one of a central processing unit (CPU), a microprocessor, a digital signal processor (DSP), a microcontroller unit (MCU), and a computing device used for running software like an artificial intelligence processor. Each computing device may include one or more cores used to execute software instructions to perform operations or processing. The processor may be built in a SoC (system on a chip) or an application-specific integrated circuit (ASIC), or may be an independent semiconductor chip. In addition to the cores used to execute the software instructions to perform operations or processing, the processor may further include a necessary hardware accelerator, for example, a field programmable gate array (FPGA), a PLD (programmable logic device), or a logic circuit implementing a dedicated logical operation.

When the modules or units described in this specification are implemented by hardware, the hardware may be any one of or any combination of a CPU, a microprocessor, a DSP, an MCU, an artificial intelligence processor, an ASIC, a SoC, an FPGA, a PLD, a dedicated digital circuit, a hardware accelerator, or a non-integrated discrete device. The hardware may run necessary software to execute the foregoing method procedure or execute the foregoing method procedure without software.

When the modules or units described in this specification are implemented by software, all or some of the modules or units may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that is accessible by a computer and that has a cache-like configuration capability, or a data storage device like a server or a data center, integrating one or more usable media that have a cache-like configuration capability.

A person of ordinary skill in the art may be aware that the units and method steps described with reference to the examples in embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, technical solutions of this application may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application may fall within the protection scope of this application.

What is claimed is:

1. A storage method, comprising:

reporting, by an over-provisioning (OP) reporting module of a storage apparatus, information about a first OP area to a cache management module of the storage apparatus, wherein the first OP area comprises unoccupied space of an OP area of a flash storage device, wherein the OP reporting module is located at a device layer of the storage apparatus, and wherein the cache management module is located at a kernel layer of the storage apparatus; and configuring, by the cache management module, a cache area based on the information about the first OP area, wherein the cache area comprises the first OP area;

wherein configuring the cache area comprises:

determining, by the cache management module, a category corresponding to a request message delivered by an application (APP), wherein the request message carries user data delivered by the APP; and determining, by the cache management module based on the category corresponding to the request message, a cache policy for the user data delivered by the APP, and caching, according to the cache policy, the user data delivered by the APP;

wherein the storage apparatus further comprises an APP grouping module; and wherein determining the category corresponding to the request message delivered by the APP comprises:

classifying, by the APP grouping module, the APP into a group out of a plurality of groups based on first information corresponding to the APP, wherein the first information comprises one or more of priority information of the APP, behavior information of the APP, or attribute information of the APP;

determining, by the APP grouping module based on a grouping status of the APP, second information corresponding to the request message delivered by the APP, wherein the second information comprises one or more of priority information of the request message, behavior information of the request message, foreground or background information of the request message, or cold or hot attribute information of the request message; and determining, by the cache management module based on the second information corresponding to the request message, the category corresponding to the request message;

wherein determining the category corresponding to the request message comprises:

determining, by the cache management module, that the category corresponding to the request message is a first category, wherein determining that the category corresponding to the request message is the first category is based on the behavior information of the request message being a specific behavior;

determining, by the cache management module, that the category corresponding to the request message is a second category, wherein determining that the category corresponding to the request message is the second category is based on the behavior information of the request message being a non-specific behavior, and one or more of the following being satisfied—the priority information of the request message is a high priority, the cold or hot attribute information is hot, or the foreground or background information is a foreground APP; or determining, by the cache management module, that the category corresponding to the request message is a third category, wherein determining that the category corresponding to the request message is the third category is based on the behavior information of the request message being a non-specific behavior, and one or more of the following being satisfied—the priority information of the request message is a low priority, the cold or hot attribute information is cold, or the foreground or background information is a background APP.

2. The method according to claim 1, wherein the cache area further comprises an OP area of a file system, and the file system is located at the kernel layer of the storage apparatus.

3. The method according to claim 1, wherein configuring the cache area comprises:

writing, by the cache management module, the user data delivered by the APP into the cache area, wherein writing the user data delivered by the APP into the cache area is based on available space of the cache area being greater than or equal to a first threshold.

4. The method according to claim 3, wherein the first threshold is one fourth of the cache area.

5. The method according to claim 1, wherein determining the cache policy for the user data delivered by the APP and caching the user data delivered by the APP comprises:

writing, by the cache management module, the user data carried in the request message into the cache area, and locking the user data carried in the request message in the cache area, wherein writing the user data carried in the request message into the cache area and locking the user data carried in the request message in the cache area are based on the category corresponding to the request message being the first category;

writing, by the cache management module, the user data carried in the request message into the cache area, wherein writing the user data carried in the request message into the cache area is based on the category corresponding to the request message being the second category; or writing, by the cache management module, the user data carried in the request message directly into a triple-level cell (TLC) storage area, wherein writing the user data carried in the request message directly into the TLC storage area is based on the category corresponding to the request message being the third category.

6. The method according to claim 1, wherein caching the user data delivered by the APP comprises:

caching, by the cache management module according to the cache policy, the user data delivered by the APP, wherein caching the user data delivered by the APP is based on available space of the cache area being less than a first threshold.

7. The method according to claim 1, wherein the storage apparatus further comprises a garbage collection management module; and wherein the method further comprises: migrating, by the garbage collection management module, the user data in the cache area to a triple-level cell (TLC) storage area, wherein migrating the user data in the cache area to the TLC storage area is based on available space of the cache area being less than a second threshold.

8. The method according to claim 7, wherein the second threshold is one eighth of the cache area.

9. The method according to claim 1, wherein the information about the first OP area comprises space storage information of the first OP area.

10. The method according to claim 1, wherein the information about the first OP area further comprises bad block information of the first OP area, and the bad block information of the first OP area is for performing bad block synchronization on the cache area.

11. The method according to claim 1, wherein the cache area is a single-level cell (SLC) cache area, a multi-level cell (MLC) cache area, a triple-level cell (TLC) cache area, or a quad-level cell (QLC) cache area.

12. An electronic device, comprising:

one or more processors; and one or more memories storing processor-executable instructions;

wherein the one or more processors are configured to execute the processor-executable instructions to cause the electronic device to perform the following:

reporting, by an over-provisioning (OP) reporting module of the electronic device, information about a first OP area to a cache management module of the electronic device, wherein the first OP area comprises unoccupied space of an OP area of a flash storage device, wherein the OP reporting module is located at a device layer of the electronic device, and wherein the cache management module is located at a kernel layer of the electronic device; and configuring, by the cache management module, a cache area based on the information about the first OP area, wherein the cache area comprises the first OP area;

wherein configuring the cache area comprises:

determining, by the cache management module, a category corresponding to a request message delivered by an application (APP), wherein the request message carries user data delivered by the APP; and determining, by the cache management module based on the category corresponding to the request message, a cache policy for the user data delivered by the APP, and caching, according to the cache policy, the user data delivered by the APP;

wherein the electronic device further comprises an APP grouping module; and wherein determining the category corresponding to the request message delivered by the APP comprises:

classifying, by the APP grouping module, the APP into a group out of a plurality of groups based on first information corresponding to the APP, wherein the first information comprises one or more of priority information of the APP, behavior information of the APP, or attribute information of the APP;

determining, by the APP grouping module based on a grouping status of the APP, second information corresponding to the request message delivered by the APP, wherein the second information comprises one or more of priority information of the request message, behavior information of the request message, foreground or background information of the request message, or cold or hot attribute information of the request message; and determining, by the cache management module based on the second information corresponding to the request message, the category corresponding to the request message;

wherein determining the category corresponding to the request message comprises:

determining, by the cache management module, that the category corresponding to the request message is a first category, wherein determining that the category corresponding to the request message is the first category is based on the behavior information of the request message being a specific behavior;

determining, by the cache management module, that the category corresponding to the request message is a second category, wherein determining that the category corresponding to the request message is the second category is based on the behavior information of the request message being a non-specific behavior, and one or more of the following being satisfied—the priority information of the request message is a high priority, the cold or hot attribute information is hot, or the foreground or background information is a foreground APP; or determining, by the cache management module, that the category corresponding to the request message is a third category, wherein determining that the category corresponding to the request message is the third category is based on the behavior information of the request message being a non-specific behavior, and one or more of the following being satisfied—the priority information of the request message is a low priority, the cold or hot attribute information is cold, or the foreground or background information is a background APP.

13. The electronic device according to claim 12, wherein the cache area further comprises an OP area of a file system, and the file system is located at the kernel layer of the electronic device.

14. The electronic device according to claim 12, wherein configuring the cache area comprises:

writing, by the cache management module, the user data delivered by the APP into the cache area, wherein writing the user data delivered by the APP into the cache area is based on available space of the cache area being greater than or equal to a first threshold.

15. The electronic device according to claim 12, wherein determining the cache policy for the user data delivered by the APP and caching the user data delivered by the APP comprises:

writing, by the cache management module, the user data carried in the request message into the cache area, and locking the user data carried in the request message in the cache area, wherein writing the user data carried in the request message into the cache area and locking the user data carried in the request message in the cache area are based on the category corresponding to the request message being the first category;

writing, by the cache management module, the user data carried in the request message into the cache area, wherein writing the user data carried in the request message into the cache area is based on the category corresponding to the request message being the second category; or writing, by the cache management module, the user data carried in the request message directly into a triple-level cell (TLC) storage area, wherein writing the user data carried in the request message directly into the TLC storage area is based on the category corresponding to the request message being the third category.

16. The electronic device according to claim 12, wherein caching the user data delivered by the APP comprises:

caching, by the cache management module according to the cache policy, the user data delivered by the APP, wherein caching the user data delivered by the APP is based on available space of the cache area being less than a first threshold.

17. The electronic device according to claim 12, wherein the electronic device further comprises a garbage collection management module; and wherein the one or more processors are further configured to execute the processor-executable instructions to cause the electronic device to perform the following: migrating, by the garbage collection management module, the user data in the cache area to a triple-level cell (TLC) storage area, wherein migrating the user data in the cache area to the TLC storage area is based on available space of the cache area being less than a second threshold.

18. The electronic device according to claim 12, wherein the information about the first OP area comprises space storage information of the first OP area.

19. The electronic device according to claim 12, wherein the information about the first OP area further comprises bad block information of the first OP area, and the bad block information of the first OP area is for performing bad block synchronization on the cache area.

20. A chip, comprising:

one or more processors; and one or more memories storing processor-executable instructions;

wherein the one or more processors are coupled to the one or more memories and are configured to execute the processor-executable instructions to cause the following to be performed by the chip:

reporting, by an over-provisioning (OP) reporting module of the chip, information about a first OP area to a cache management module of the chip, wherein the first OP area comprises unoccupied space of an OP area of a flash storage device, wherein the OP reporting module is located at a device layer of the chip, and wherein the cache management module is located at a kernel layer of the chip; and configuring, by the cache management module, a cache area based on the information about the first OP area, wherein the cache area comprises the first OP area;

wherein configuring the cache area comprises:

determining, by the cache management module, a category corresponding to a request message delivered by an application (APP), wherein the request message carries user data delivered by the APP; and determining, by the cache management module based on the category corresponding to the request message, a cache policy for the user data delivered by the APP, and caching, according to the cache policy, the user data delivered by the APP;

wherein the chip further comprises an APP grouping module; and wherein determining the category corresponding to the request message delivered by the APP comprises:

classifying, by the APP grouping module, the APP into a group out of a plurality of groups based on first information corresponding to the APP, wherein the first information comprises one or more of priority information of the APP, behavior information of the APP, or attribute information of the APP;

determining, by the APP grouping module based on a grouping status of the APP, second information corresponding to the request message delivered by the APP, wherein the second information comprises one or more of priority information of the request message, behavior information of the request message, foreground or background information of the request message, or cold or hot attribute information of the request message; and determining, by the cache management module based on the second information corresponding to the request message, the category corresponding to the request message;

wherein determining the category corresponding to the request message comprises:

determining, by the cache management module, that the category corresponding to the request message is a first category, wherein determining that the category corresponding to the request message is the first category is based on the behavior information of the request message being a specific behavior;

determining, by the cache management module, that the category corresponding to the request message is a second category, wherein determining that the category corresponding to the request message is the second category is based on the behavior information of the request message being a non-specific behavior, and one or more of the following being satisfied—the priority information of the request message is a high priority, the cold or hot attribute information is hot, or the foreground or background information is a foreground APP; or determining, by the cache management module, that the category corresponding to the request message is a third category, wherein determining that the category corresponding to the request message is the third category is based on the behavior information of the request message being a non-specific behavior, and one or more of the following being satisfied—the priority information of the request message is a low priority, the cold or hot attribute information is cold, or the foreground or background information is a background APP.

* * * * *